(12) United States Patent
Hrastnik

(10) Patent No.: US 12,360,830 B2
(45) Date of Patent: Jul. 15, 2025

(54) SERVICE MAPPING AND COMPOSITION INFRASTRUCTURE

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 454 days.

(21) Appl. No.: 17/975,997

(22) Filed: Oct. 28, 2022

(65) Prior Publication Data

US 2024/0143417 A1   May 2, 2024

(51) Int. Cl.
*G06F 9/52* (2006.01)
*G06F 9/54* (2006.01)
*G06F 40/279* (2020.01)

(52) U.S. Cl.
CPC ............ *G06F 9/542* (2013.01); *G06F 40/279* (2020.01)

(58) Field of Classification Search
None
See application file for complete search history.

(56) References Cited

U.S. PATENT DOCUMENTS 8,719,263 B1 * 5/2014 Nair ............... G06F 16/122
707/736
2019/0220574 A1 * 7/2019 Shah ............... H04L 69/08

* cited by examiner

*Primary Examiner* — Craig C Dorais
(74) *Attorney, Agent, or Firm* — Buckley, Maschoff & Talwalkar LLC

(57) ABSTRACT

A system and method including receiving a request to map a first service accessible on a first application stack; determining, based on a combination of metadata of the first service and other services in the first application stack that are related to the first service, metadata associated with entities in the first application stack, and trace data associated with data flows between the entities, a complete mapping of the first service, the other services, and the entities comprising business object representations of the first service and business object representations of other services in the first application stack; deriving, based on the determined complete mapping, service mapping information for the first application stack; and persisting the generated service mapping information and the determined complete mapping in a persistency.

20 Claims, 58 Drawing Sheets

FIG. 5

| ABAP | | EDM | |
|---|---|---|---|
| Type | Sample Value | Type | Sample Value |
| CHAR(1) | X | Boolean | True |
| RAW(16) | 42010AEF4C9F1EED8AD40EB791BECFEA | Guid | 42010aef-4C9f-1eed-8ad4-0eb791becfea |

FIG. 6

| Original Value | Input Conversion | Result |
|---|---|---|
| 123 | ALPHA | 00000123 |
| abc | UPPER CASE | ABC |
| ' EN ' | TRIM | 'EN' |

FIG. 7

| Standard * ⌄ | | | |
|---|---|---|---|
| Product ID: | | Product Group: | |
| PC_* × ⛶ | | =PC × ⛶ | Go   Adapt Filters (2) ↗ |

Create And Assign    Deactivate  Activate  Create  Delete  ⚙
Product Group

| **Standard * ⌄** | | | 🖶  > |
|---|---|---|---|
| Product ID | Product Group | Product Status | |
| ○ PC_1 (Gaming PC) | PC | A (Active) | > |
| ○ PC_2 (Workstation) | PC | A (Active) | > |

FIG. 8

.../VDMDEMODM_UIV2_PRODMANAGE;v=0001/ProductEntity?$filter=startswith(ID, 'PC_') and GroupID eq 'PC' ...

FIG. 9

SQL Trace Record

Details For Selected SQL Trace Record

```
SELECT
  /* FDA READ */
  "MANDT" , "ID" , "NAME" , "GROUPID" , "STATUS" , "STATUSTEXT"
FROM
  "VDMDEMODM_C_PRODUCTMANAGE"
WHERE
  "MANDT" = ? AND "ID" LIKE ? ESCAPE ? AND "GROUPID" = ? WITH
  RANGE_RESTRICTION('CURRENT')
```

1005

Variables

| ID | NAME | GROUPID | STATUS | STATUSTEXT |
|---|---|---|---|---|
| PC_1 | Gaming PC | PC | A | Active |
| PC_2 | Workstation | PC | A | Active |

FIG. 11

```
<entry>
<id>https://.../VDMDEMODM_UIV2_PRODMANAGE/ProductEntity ('PC_1')</id>
...
<content type="application/xml">
<m:properties ...">
    <d:ID>PC_1</d:ID>
    <d:Name>Gaming PC</d:Name>
    <d:GroupID>PC</d:GroupID>
    <d:Status>A</d:Status>
    <d:StatusText>Active</d:StatusText>
</m:properties>
</content>
</entry>
<entry>
<id>https://.../VDMDEMODM_UIV2_PRODMANAGE/ProductEntity('PC_2')</id>
...
<content type="application/xml">
<m:properties ...>
    <d:ID>PC_2</d:ID>
    <d:Name>Workstation</d:Name>
    <d:GroupID>PC</d:GroupID>
    <d:Status>A</d:Status>
    <d:StatusText>Active</d:StatusText>
</m:properties>
</content>
</entry>
```

FIG. 12

| UI Label | Product ID | (Product ID) | Product Group | Product Status | (Product Status) |
|---|---|---|---|---|---|
| OData | ID | Name | GroupID | Status | StatusText |
| SQL | ID | NAME | GROUPID | STATUS | STATUSTEXT |

FIG. 13

```
<EntityType Name="ProductEntityType" ...>
    <key>
        <PropertyRef Name="ID"/>
    </key>
    <Property Name="ID"... sap:text="Name" sap:label="Product ID" .../>
    <Property Name="Name" ... sap:label="Product Name"/>
    <Property Name="GroupID" ... sap:label="Product Group" .../>
    <Property Name="Status" ... sap:text="StatusText" sap:label="Product Status" .../>
    <Property Name="StatusText" ... sap:label="Status Text" .../>
</EntityType>
```

FIG. 14

| Field | Is Key Field |
|---|---|
| ID | Yes |
| NAME | No |
| GROUPID | No |
| STATUS | No |
| STATUSTEXT | No |

FIG. 15

```
define root view entity VDMDEMODM_C_ProductManage
   as select from VDMDEMODM_R_ProductTP
{
  key Product as ID,
      _Text[1:Language=$session.system_language]. ProductName as Name,
      ProductGroup as GroupID,
      ProductStatus as Status,
      _ProductStatus._Text[1:Language=$session.system_language].
         ProductStatusText as StatusText
}
```

FIG. 16

```
define root view entity VDMDEMODM_R_ProductTP
    as select from VDMDEMODM_I_Product
    composition [0..*] of VDMDEMODM_R_ProductTextTP as _Text
{
    key Product,
        ProductType,
        ProductGroup,
        ProductIsConfigurable,
        ProductStatus,
        CreationDate,
    ...
        _Text,
        _ProductStatus
}
```

FIG. 17

```
define view entity VDMDEMODM_R_ProductTextTP
    as select from VDMDEMODM_I_ProductText
    association to parent VDMDEMODM_R_ProductTP as _Product
        on $projection.Product = _Product.Product
{
    key Language,
    key Product,
        ProductName,
        ProductDescription,
    ...
        _Product
}
```

FIG. 18

```
define root view VDMDEMODM_I_Product                  1905
    as select from VDMDEMOD_DM_P
    composition [0..*] of VDMDEMODM_I_ProductText as _Text
    association [0..1] to VDMDEMODM_I_ProductStatus as _ProductStatus
        on $projection.ProductStatus = _ProductStatus.ProductStatus
{
    key Product,
        Product Type,
        Product Group,
        ProductIsConfigurable,
        ProductStatus,
        CreationDate,
    ...                 1910
        _Text,
                        1915
        _ProductStatus
}
```

FIG. 19

```
define view VDMDEMODM_I_ProductText        2005
    as select from VDMDEMOD_DM_PT
    association to parent VDMDEMODM_I_Product as _Product
        on $projection.Product = _Product.Product
{
    key Language,
    key Product,
        ProductName,
        ProductDescription,
    ...
}
```

FIG. 20

```
define root view entity VDMDEMODM_I_ProductStatus
    as select from VDMDEMOD_DM_PS        2105                    2110
    composition [0..*] of VDMDEMODM_I_ProductStatusText as _Text
{
    key ProductStatus,
        ...
        _Text
}
```

FIG. 21

```
define view entity VDMDEMODM_I_ProductStatusText
    as select from VDMDEMOD_DM_PST    ←—— 2205
    association to parent VDMDEMODM_I_ProductStatus as _ProductStatus
      on $projection.ProductStatus = _ProductStatus.ProductStatus {
    key Language,
    key ProductStatus,
        ProductStatusText,
        _ProductStatus,
}
```

FIG.22

| Occurrence | UI Table Label | Field Mappings | | | | | | |
|---|---|---|---|---|---|---|---|---|
| | | Product ID | (Product ID) | Product Group | (Product Status) | | | |
| | ODataProductEntity | | | | | | | |
| | CDS...C_ProductManage | ID | Name | Group ID | Status | StatusText | | |
| | CDS...R_ProductTP | ID | Name | Group ID | Status | StatusText | ProductType | |
| | CDS...I_Product | Product | | Product Group | Product Status | | ProductType | |
| | Table...DM_P | Product | | Product Group | Product Status | | ProductType | |
| | CDS...R_ProductTextTP | | Product Name | | | | | Product Description |
| | CDS...I_ProductText | | Product Name | | | | | Product Description |
| | Table...DM_PT | | Product Name | | | | | Product Description |
| | CDS...I_ProductStatusText | | | | | ProductStatus Text | | |
| | Table...DM_PST | | | | | ProductStatus Text | | |

FIG. 25

{"Service":

{"AccessChannel":"SQL",

"Entities":[

{"Entity":

{"Name":"VDMDEMODM_C_ProductManage",

"InstanceBinding":{"ConditionID":"1"},

"Fields":[

{"Name":"ID",

"ValueBindings":[{"BoundEntity":"VDMDEMODM_R_ProductTP", — 2615

"BoundField":"Product"}]},

2620

{"Name":"Name",

"ValueBindings":[{"BoundEntity":"VDMDEMODM_R_ProductTextTP",
2630

"BoundField":"ProductName",

"InstanceBinding":{"ConditionID":"100"}}]},

FIG. 26A

```
{"Name":"GroupID",
   "ValueBindings":[{"BoundEntity":"VDMDEMOD_R_Product TP",
                    "BoundField":"Product Group"}]},
 {"Name":"Status",
   "ValueBindings":[{"BoundEntity":"VDMDEMODM_R_ProductTP",
                    "BoundField":"ProductStatus"}]},         2645
 {"Name":"StatusText",
   "ValueBindings":[{"BoundEntity":"VDMDEMODM_I_ProductStatusText",
                    "BoundField":"ProductStatusText",
                    "InstanceBinding":{"ConditionID":"200"}}]}
 ]}}],
"BindingConditions":[            2605
  {"ID":"1",
   "Type":"ELEMENTARY",
   "Entity":"VDMDEMODM_C_ProductManage",
   "Field":"ID",
   "Operator":"EQUAL",                          2610
   "BoundEntity":"VDMDEMODM_R_ProductTP",
   "BoundField":"Product"},
  {"ID":"2",
   "Type":"ELEMENTARY",
   "Entity":"VDMDEMODM_C_ProductManage",
   "Field":"ID",
   "Operator":"EQUAL",           2635
   "BoundField":"Product",
   "BoundEntity":"VDMDEMODM_R_Product TextTP"},
  {"ID":"3",
   "Type":"ELEMENTARY",                  2640
   "SystemField":"LOGON_LANGUAGE",
   "Operator":"EQUAL",
   "BoundField":"Language",
```

FIG. 26B

```
        "BoundEntity":"VDMDEMODM_R_ProductTextTP"},
       {"ID":"4",
        "Type":"ELEMENTARY",
        "Entity":"VDMDEMODM_C_ProductManage",
        "Field":"Status",
        "Operator":"EQUAL",
        "BoundField":"ProductStatus",
        "BoundEntity":"VDMDEMODM_I_ProductStatus"},
       {"ID":"5",
        "Type":"ELEMENTARY",
        "Entity":"VDMDEMODM_I_ProductStatus",
        "Field":"ProductStatus",
        "Operator":"EQUAL",
        "BoundField":"ProductStatus",
        "BoundEntity":"VDMDEMODM_I_ProductStatusText"},
       {"ID":"6",
        "SystemField":"LOGON_LANGUAGE",
        "Operator":"EQUAL",
        "BoundField":"Language",
        "BoundEntity":"VDMDEMODM_I_ProductStatusText"}},
       {"ID":"100",                              2625
        "Type":"GROUP",
        "Group":[{"ConditionID":"1"},
                 {"Operator":"AND"},
                 {"ConditionID":"2"},
                 {"Operator":"AND"},
                 {"ConditionID":"3"}]},
       {"ID":"200",
        "Type": "GROUP",                         2650
        "Group":[{"ConditionID":"1"},
                 {"Operator":"AND"},
                 {"ConditionID":"4"},
                 {"Operator":"AND"},
                 {"ConditionID":"5"},
                 {"Operator":"AND"},
                 {"ConditionID":"6"}]}
    }}
```

FIG. 26C

SELECT VDMDEMODM_R_Product TextTP~ProductName

FROM VDMDEMODM_R_ProductTP

LEFT OUTER JOIN VDMDEMODM_R_ProductTextTP

ON VDMDEMODM_R_ProductTextTP~Product = VDMDEMODM_R_ProductTP~Product

AND VDMDEMODM_R_ProductTextTP~Language = $LOGON_LANGUAGE

FIG. 27

```
extend view entity VDMDEMODM_C_ProductManage with {

VDMDEMODM_R_ProductTP.GlobalTradeItemNumber

```
@Metadata.layer: #LOCALIZATION annotate view VDMDEMODM_C_ProductManage with

{

@UI.lineItem: [{ importance: #HIGH, position: 40 }]

GlobalTradeItemNumber;

| Load Data | Save Data | | | | | | | |
|---|---|---|---|---|---|---|---|---|
| Template Service | | | | New Service | | | | |
| Service Type: | UI Application ▽ | | | Service Type: | | UI Application ▽ | | |
| Service Name: | https://...SAP ▽ | | | Service Name: | | https://...Customer ▽ | | |
| Service Entity Type: | UI Table Control ▽ | | | Service Entity Type: | | UI Table Control ▽ | | |
| Service Entity Name: | Products ▽ | | | Service Entity Name: | | YY_Products ▽ | | |
| Display Field Mappings | | | | | Generate Service | | | |

| Ordinal Number | Service Field Label | Service Field Name | Selected | Entity Type | Entity Name | Entity Field Name | Conversion |
|---|---|---|---|---|---|---|---|
| 1 | Product ID | ID | Yes | CDS Entity | ...I_Product | Product | |
| 2 | (Product ID) | Name | Yes | CDS Entity | ...I_ProductText | ProductName | 1 |
| 3 | Product Group | GroupID | Yes | CDS Entity | ...I_Product | ProductGroup | |
| 4 | Product Status | Status | Yes | CDS Entity | ...I_Product | ProductStatus | |
| 5 | (Product Status) | StatusText | | CDS Entity | ...I_ProductStausText | ProductStatusText | 2 |
| 6 | Product Description | Product Description | | CDS Entity | ...I_ProductText | Product Description | |
| 7 | Product Type | Product Type | | CDS Entity | ...I_Product | ProductType | |
| 8 | ... | | | | | ... | |

Conversion: 1 ▽  _Text[1:Language=$session.system_language].ProductName

FIG. 33

| Load Data | Save Data | | |
|---|---|---|---|
| Template Service | | New Service | |
| Service Type: | UI Application ▽ | Service Type: | UI Application ▽ |
| Service Name: | https://...SAP | Service Name: | https://...Customer |
| Service Entity Type: 3405 | UI Table Control ▽ | Service Entity Type: | UI Table Control |
| Service Entity Name: | Products ▽ | Service Entity Name: | YY_Products |
| Display Field Mappings | | Generate Service | 3415 |

| Ordinal Number | Service Field Label | Service Field Name | Selected | Entity Type | Entity Name | Selected | Entity Type | Entity Name | Entity Field Name | Conversion |
|---|---|---|---|---|---|---|---|---|---|---|
| 1 | Product ID | Product | Yes | CDS Entity | ..._I_Product | | | | Product | |
| 2 | (Product ID) | ProductName | Yes | CDS Entity | ..._I_ProductText | | | | ProductName | 1 |
| 3 | Product Group | GroupID | | CDS Entity | ..._I_Product | | | | ProductGroup | |
| 4 | Product Status | Status | | CDS Entity | ..._I_Product | | | | ProductStatus | |
| 5 | (Product Status) | StatusText | Yes | CDS Entity | ..._I_ProductStausText | | | | ProductStatusText | 2 |
| 6 | Product Description | Product Description | Yes | CDS Entity | ..._I_ProductText | | | | Product Description | 3 |
| 7 | Product Type | Product Type | | CDS Entity | ..._I_Product | | | | ProductType | |
| 8 | ... | | | | ... | | | | ... | |

Calculation logic: 1 ▽  ← 3410 case when _Text[1:Language=$session.system_language].ProductName is null
then _Text[1:Language='E'].ProductName
else _Text[1:Language=$session.system_language].ProductName
end as ProductName

FIG. 34

```
define view entity YY_Products as select from VDMDEMODM_I_Product

{ key Product, case when _Text[1:Language=$session.system_language].ProductName is null then _Text[1:Language= 'E'].ProductName else _Text[1:Language=$session.system_language].ProductName end as ProductName, case when _Text[1:Language=$session.system_language].ProductDescription is null then _Text[1:Language='E'].ProductDescription else _Text[1:Language=$session.system_language].ProductDescription
    end as ProductDescription, ProductType

```
{"Service":
    {"AccessChannel":"SQL",
    "Entities":[
        {"Entity":
            {"Name":"YY_Products",
                "InstanceBinding":{"ConditionID":"1"},
                "Fields":[
                    {"Name":"Product",
                        "ValueBindings":[{"BoundEntity":"VDMDEMODM_I_Product",
                                        "BoundField":"Product"}]},
                    {"Name":"ProductName",
                        "ValueBindings":[{"BoundEntity":"VDMDEMODM_I_ProductText",
                                        "BoundField":"ProductName",
                                        "InstanceBinding":{"ConditionID":"200"}}]},
                    {"Name":"ProductDescription",
                        "ValueBindings":[{"BoundEntity":"VDMDEMODM_I_ProductText",
                                        "BoundField":"ProductDescription",
                                        "InstanceBinding":{"ConditionID": "300"}}]},
                    {"Name":"ProductType",
                        "ValueBindings":[{"BoundEntity":"VDMDEMODM_I_Product",
                                        "BoundField":"ProductType"}]},
                ]}],
        "BindingConditions":[
```

FIG. 36A

```
{"ID":"1",
    "Type":"ELEMENTARY",
    "Entity":"YY_Products",
    "Field":"Product",
    "Operator":"EQUAL",
    "BoundEntity":"VDMDEMODM_I_Product",
    "BoundField":"Product"},
{"ID":"2",
    "Type":"ELEMENTARY",
    "Entity":"YY_Products",
    "Field":"Product",
    "Operator":"EQUAL",
    "BoundField":"Product",
    "BoundEntity":"VDMDEMODM_I_ProductText"},
{"ID":"3",
    "Type":"ELEMENTARY",
    "SystemField":"LOGON_LANGUAGE",
    "Operator":"EQUAL",
    "BoundField":"Language",
    "BoundEntity":"VDMDEMODM_I_ProductText"},
{"ID":"4",
    "Type":"ELEMENTARY",
    "Entity":"YY_Products",
    "Constant":"E",
    "Operator":"EQUAL",
    "BoundField":"Language",
    "BoundEntity":"VDMDEMODM_I_ProductText"},
{"ID":"5",
    "Type":"ELEMENTARY",
    "Operator":"IS NULL",
```

FIG. 36B

```
"BoundField":"ProductName",
"BoundEntity":"VDMDEMODM_I_ProductText"},
{"ID":"6",
 "Type":"ELEMENTARY",
 "Operator":"IS NULL",
 "BoundField":"productDescription",
 "BoundEntity":"VDMDEMODM_I_ProductText"},
{"ID":"100",
 "Type":"GROUP",
 "Group":[{"ConditionID":"1"},
          {"Operator":"AND"},
          {"ConditionID":"2"},
          {"Operator":"AND"},
          {"ConditionID":"3"}]},
{"ID":"110",
 "Type":"GROUP",
 "Group":[{"ConditionID":"1"},
          {"Operator:"AND"},
          {"ConditionID":"2"},
          {"Operator": "AND"},
          {"ConditionID":"4"}]},
{"ID":"200",
 "Type":"GROUP",
 "Group":[{"Operator":"IF"},
          {"ConditionID":"100"},
          {"Operator:"AND" },
          {"ConditionID":"5"},
          {"Operator:"THEN"},
          {"ConditionID":"110"},
```

FIG. 36C

```
            {"Operator":"ELSE"},
            {"ConditionID":"100"}]},
{"ID":"300",
 "Type":"GROUP",
 "Group":[{"Operator":"IF"},
          {"ConditionID":"100"},
          {"Operator":"AND"},
          {"ConditionID":"6"},
          {"Operator":"THEN"},
          {"ConditionID":"110"},
          {"Operator":"ELSE"},
          {"ConditionID":"100"}]}
}}
```

FIG. 36D

```
,,,"InstanceBinding":{"Exits":[{"AccessChannel":"SQL",
                                "ObjectName":"YY_INSTANCE_BINDING",
                                "ObjectType":"CDS_VIEW"}]},
```

FIG. 37

```
{"Services":[
    {"Service":
        {"Name":"YY_PRODUCT_SERVICE",
         "Requests":[
            {"RequestID":"1",
             "Entity":"YY_Products",
             "Type":"READ",
             "FilterConditions":[
                {"Field":"Product",
                 "Operator":"EQUAL",
                 "Value":"PC_2"}],
             "RequestedFields":[
                {"Field":"Product"},
                {"Field":"ProductName"}]
            }]}}]}
```

FIG. 38 select VDMDEMODM_I_Product~Product, case when VDMDEMODM_I_Produc~\_Text(Language = @sy-langu]-ProductName is null then VDMDEMODM_I_Product~\_Text[Language = 'E']-ProductName else VDMDEMODM_I_Product~\_Text [Language = @sy-langu]-ProductName end as ProductName from VDMDEMODM_I_Product where VDMDEMODM_I_Product~Product = 'PC_2'

FIG. 39

```
{"Services":[

{"Service":[

{"RequestID":"1",

"Result":{"Data":[{"Field":"Product","Value":"PC_2"},

{"Field":"ProductName","Value":"Workstation"}]}

.../VDMDEMODM_UIV2_PRODMANAGE;v=0001/ActivateProduct?ID='MON_1'

FIG. 44

| METHOD | ACTIVATEPRODUCT | | | |
|---|---|---|---|---|
| PARAMS | NAME | KEYS | | |
| | ROLE | Action(ACTIVATEPRODUCT), VDMDEMODM_C_PRODUCTMANAGE | | |
| | DATA | %ref : d224 | %CID_REF | |
| | | | ID | MON_1 |

FIG. 45

| METHOD | SETSTATUS | | | |
|---|---|---|---|---|
| PARAMS | NAME | KEYS | | |
| | ROLE | ACTION(SETSTATUS), VDMDMODM_R_PRODUCTTP | | |
| | DATA | %ref : d246 | %CID_REF | |
| | | | %IS_DRAFT | |
| | | | PRODUCT | MON_1 |
| | | | %PARM | PRODUCTSTATUS A |

FIG. 46

```
{"Service":

{"AccessChannel":"ABAP_EML",
   "Entities":[
    {"Entity":
      {"Name":"VDMDEMODM_C_ProductManage",
       "InstanceBinding":{"ConditionID":"1"},
       "Operations":[
        {"Operation":
          {"Name":"ActivateProduct",
           "Type":"EXECUTE",
           "OperationBindings":[
            {"OperationBinding":
              {"ID":"1",
               "Type":"EXECUTE",
               "EntityName":"VDMDEMODM_R_ProductTP",
               "ActionName":"SetStatus",
               "ValueBindings": [{"BoundParameter":"ProductStatus",
                                  "Constant":"A"}]}}]}}],
       "BindingConditions":[
        {"ID":"1",
         "Type":"ELEMENTARY",
         "Entity":"VDMDEMODM_C_ProductManage",
         "Field":"ID",
         "Operator":"EQUAL",
         "BoundEntity":"VDMDEMODM_R_ProductTP",
         "BoundField":"Product"}]
}}
```

FIG. 47

.../VDMDEMODM_UIV2_PRODMANAGE;v=0001/CreateAndAssignProductGroup?ID='MON_1'&ProductGroup='MONITOR'
&ParentProductGroup='IT_EQUIPMENT'

FIG. 49

| type filter text | | | |
|---|---|---|---|
| Procedure | Processed Objects | | Message |
| > ⌐ Instance Permission Phase | | | Executing instance authorizations (if required) |
| ⌐ Instance Permission Phase | | | |
| ∨ ⌐ CALL_HANDLER(Modify) | CL_VDMDEMODM_C_PRODUCTMANA_PRODUCTMANAGE | | Call(Modify){0:675}LHC_PRODUCTMANAGEALIAS=>CREATEANDASSIGN |
| > [ EML Read | | | IMAGE:TRANSECTIONAL,ENTITYOPERATIONS:1, READS:1 |
| ⌐ EML Read | | | OUT_OPERATIONS |
| > ⌐ EML Modification | | | ENTITY OPERATIONS:1,CREATES:1 |
| ⌐ EML Modification | | | |
| > ⌐ EML Modification | | | ENTITY OPERATIONS:1,UPDATES:1 |
| ⌐ EML Modification | | | |
| ⌐ CALL_HANDLER(Modify) | | | |
| ⌐ Process Modification | | | |

FIG. 50

| METHOD | CREATEANDASSIGNPRODUCT GROUP | | | | |
|---|---|---|---|---|---|
| PARAMS | NAME | KEYS | | | |
| | ROLE | Action(CREATEANDASSIGNPRODUCTGROUP), VDMDEMODM_C_PRODUCTMANAGE | | | |
| | DATA | %ref : d214 | %CID_REF | | |
| | | | ID | MON_1 | |
| | | | %PARAM | PRODUCTGROUP | MONITOR |
| | | | | PARENTPRODUCTGROUP | IT_EQUIPMENT |

FIG. 51

| ACTIVITIES | OP | | | | | | |
|---|---|---|---|---|---|---|---|
| | ENTITY_NAME | R | | | | | |
| | | VDMDEMODM_R_PRODUCTGROUPTP | | | | | |
| | SUB_NAME | | | | | | |
| | INSTANCES | %ref : d268 | %IS_DRAFT | | | | |
| | | | PRODUCTGROUP | MONITOR | | | |
| | | | | | PRODUCTGROUP | 01 |
| | | | | | PARENTPRODUCTGROUP | 01 |
| | | | | | CREATIONDATE | 01 |
| | | | | | CREATIONTIME | 01 |
| | | | | | CREATIONDATETIME | 01 |
| | | | | | CREATEDBYUSER | 01 |
| | | | | | LOCALINSTANCELASTCHANGEDATE | 01 |
| | | | | | LOCALINSTANCELASTCHANGETIME | 01 |
| | | | | | LOCALINSTANCELASTCHANGEDTETME | 01 |
| | | | | | LOCALINSTANCELASTCHANGEDBYUSER | 01 |
| | | | | | LASTCHANGEDATE | 01 |
| | | | | | LASTCHANGETIME | 01 |
| | | | | | LASTCHANGEDATETIME | 01 |
| | | | | | LASTCHANGEDBYUSER | 01 |
| | | | | %CONTROL | | |

FIG. 52

| ACTIVITIES | OP | C | | |
|---|---|---|---|---|
| | ENTITY_NAME | VDMDEMODM_R_PRODUCTGROUPTP | | |
| | SUB_NAME | | | |
| | INSTANCES | %ref : d394 | %CID | MY_CID_MONITOR |
| | | | %IS_DRAFT | |
| | | | PRODUCTGROUP | MONITOR |
| | | | PARENTPRODUCTGROUP | IT_EQUIPMENT |
| | | | CREATIONDATE | 00000000 |
| | | | CREATIONTIME | 000000 |
| | | | CREATIONDATETIME | 0 |
| | | | CREATEDBYUSER | |
| | | | LOCALINSTANCELASTCHANGEDATE | 00000000 |
| | | | LOCALINSTANCELASTCHANGETIME | 000000 |
| | | | LOCALINSTANCELASTCHANGEDTETME | 0 |
| | | | LOCALINSTANCELASTCHANGEDBYUSER | |
| | | | LASTCHANGEDATE | 00000000 |
| | | | LASTCHANGETIME | 000000 |
| | | | LASTCHANGEDATETIME | 0 |
| | | | LASTCHANGEDBYUSER | |

FIG. 53

| ACTIVITIES | OP | U | | |
|---|---|---|---|---|
| | ENTITY_NAME | VDMDEMODM_R_PRODUCTTP | | |
| | SUB_NAME | | | |
| | INSTANCES | %ref.d682 | %CID_REF | |
| | | | %IS_DRAFT | |
| | | | PRODUCT | MON_1 |
| | | | PRODUCTTYPE | MONITOR |
| | | | PRODUCTGROUP | |
| | | | PRODUCTISCONFIGURABLE | 00000000 |
| | | | PRODUCTSTATUS | 000000 |
| | | | CREATIONDATE | 0 |
| | | | CREATIONTIME | |
| | | | CREATIONDATETIME | |
| | | | CREATEDBYUSER | |
| | | | LASTCHANGEDATE | 00000000 |
| | | | LASTCHANGETIME | 000000 |
| | | | LASTCHANGEDATETIME | 0 |
| | | | LASTCHANGEDBYUSER | |
| | | | LOCALINSTANCELASTCHANGEDATE | 00000000 |
| | | | LOCALINSTANCELASTCHANGETIME | 000000 |

FIG. 54

```
{"Services":[
 {"Service":
  {"AccessChannel":"ABAP_EML",
   "Entities": [
      {"Entity":
        {"Name":"VDMDEMODM_C_ProductManage",
         "Operations":[
            {"Operations":
               {"Name": "CreateAndAssignProductGroup"
                "Type":"EXECUTE",
                  "OperationBindings":[
                  {"OperationBinding":
                    {"ID":"1",
                     "Type":"MODIFY",
                     "EntityName":"VDMDEMODM_R_ProductGroupTP",
                     "ValueBindings": [
                        {"Parameter":"ProductGroup","BoundField":"ProductGroup"},
               {"Parameter":"ParentProductGroup","BoundField":"ParentProductGroup"}]}},
                  {"OperationBinding":
                    {"ID":"2",
                     "PredecessorID":"1",
                     "Type":"UPDATE",
                     "EntityName":"VDMDEMODM_R_ProductTP",
                     "InstanceBinding":{"ConditionID":"1"},
                     "ValueBindings":[
                        {"Parameter":"ProductGroup","BoundField":"ProductGroup"}]
          }}]}}]}],
   "BindingConditions":[
      {"ID":"1",
   "Type":"ELEMENTARY",
  "Entity":"VDMDEMODM_C_ProductManage",
     "Field":"ID",
      "Operator":"EQUAL",
      "BoundEntity":"VDMDEMODM_R_ProductTP",
      "BoundField":"Product"}]
 }}
```

FIG. 55

```
{"Services": [
    {"Service":
        {"AccessChannel":"ABAP_EML",
          "Entities": [
             {"Entity":
                  {"Name":"VDMDEMODM_I_ProductTP",
                   "InstanceBinding":{"ConditionID":"1"},
```

FIG. 57A

```
        "Operations":[
          {"Operation":
            {"Type":"MODIFY",
             "OperationBindings":[
               {"OperationBinding":
                 {"ID":"1",
                  "Type":"MODIFY",
                  "EntityName":"VDHDEMODM_R_ProductTP",
                  "ValueBindings":[
                     {"Field":"ProductGroup","BoundField":"ProductGroup"},
                 {"Field":"ParentProductGroup","BoundField":"ParentProductGroup"}]}}
        ]}}],
    {"Entity":
      {"Name":"VDMDEMODM_I_ProductGroupTP",
       "InstanceBinding":{"ConditionID":"2"},
       "Operations":[
           {"Operation":
             {"Type":"MODIFY",
              "OperationBindings":[
                {"OperationBinding":
                   {"ID":"2",
                    "PredecessorID":"1",
                    "Type":"MODIFY",
                    "EntityName":"VDMDEMODM_R_ProductGroupTP",
                    "ValueBindings":[
                        {"Field":"ProductGroup", "BoundField":"ProductGroup"}]
         }}]}}],
"BindingConditions":[
   {"ID":"1",
    "Type":"ELEMENTARY",
    "Entity":"VDMDEMODM_I_ProductTP",
```

FIG. 57B

```
            "Field":"Product",
            "Operator":"EQUAL",
            "BoundEntity":"VDMDEMODM_R_ProductTP",
            "BoundField":"Product"},
         {"ID":"2",
            "Type":"ELEMENTARY",
            "Entity":"VDMDEMODM_I_ProductGroupTP",
            "Field":"ProductGroup",
            "Operator":"EQUAL",
            "BoundEntity":"VDMDEMODM_R_ProductGroupTP",
            "BoundField":"ProductGroup"}]
}}
```

FIG. 57C

```
{"Services":[
  {"Service":
    {...,
     "Requests":[
       {"RequestID":"1",
        "Entity":"VDMDEMODM_I_ProductGroupTP",
        "Type":"MODIFY",
        "DataRecords":[
         {"OrdinalNumber":1,
          "DataRecord:[
            {"Field":"ProductGroup","Value"="INPUT_DEVICE"},
            {"Field":"ParentProductGroup"},"Value"="IT_EQUIPMENT"}]},
        {"OrdinalNumber":2,
         "DataRecord:[
            {"Field":"ProductGroup","Value"="KEYBOARD"},
            {"Field":"ParentProductGroup"},"Value"="INPUT_DEVICE"}]}},
       {"RequestID":"2",
        "PredecessorRequestID":"1",
        "Entity":"VDMDEMODM_I_ProductTP",
        "Type":"UPDATE",
        "DataRecords":[
           {"OrdinalNumber":1,
            "DataRecord:[
               {"Field":"Product","Value"="KB_1"},
               {"Field":"ProductGroup"},"Value"="KEYBOARD"}]}]
  }}]}
```

```
┌─────────────────────────────────────────────────────────────────┐
│  RECEIVE A REQUEST TO MAP A FIRST SERVICE ACCESSIBLE ON A FIRST  │
│  APPLICATION STACK, DATA AND OPERATION FLOW IN THE FIRST         │
│  APPLICATION STACK BEING BASED ON SERVICE INVOCATIONS BETWEEN    │
│  BUSINESS OBJECT REPRESENTATIONS WITHIN THE FIRST APPLICATION    │
│  STACK                                                     6005  │
└─────────────────────────────────────────────────────────────────┘
                                  │
                                  ▼
┌─────────────────────────────────────────────────────────────────┐
│  DETERMINE, BASED ON A COMBINATION OF METADATA AND TRACE DATA,   │
│  A COMPLETE MAPPING OF THE FIRST SERVICE, THE OTHER SERVICES,    │
│  AND THE ENTITIES COMPRISING BUSINESS OBJECT REPRESENTATIONS     │
│  OF THE FIRST SERVICE AND BUSINESS OBJECT REPRESENTATIONS OF     │
│  OTHER SERVICES IN THE FIRST APPLICATION STACK                   │
│                                                            6010  │
└─────────────────────────────────────────────────────────────────┘
                                  │
                                  ▼
┌─────────────────────────────────────────────────────────────────┐
│    DERIVE, BASED ON THE DETERMINED COMPLETE MAPPING, SERVICE     │
│        MAPPING INFORMATION FOR THE FIRST APPLICATION STACK       │
│                                                            6015  │
└─────────────────────────────────────────────────────────────────┘
                                  │
                                  ▼
┌─────────────────────────────────────────────────────────────────┐
│      PERSIST THE GENERATED SERVICE MAPPING INFORMATION AND       │
│     THE DETERMINED COMPLETE MAPPING IN A PERSISTENCY             │
│                                                            6020  │
└─────────────────────────────────────────────────────────────────┘
```

FIG. 60

SERVICE MAPPING AND COMPOSITION INFRASTRUCTURE

BACKGROUND

A wide variety of applications and services are available, whether deployed on premise, as a cloud service, or a combination thereof, to implement operational processes of an enterprise or other entity. In some instances, the applications and services may offer some level of customization to adjust some features of the provided applications and services. However, such customizations are typically limited in scope, being confined to predefine adaptation options such as, for example, user interface (UI) personalization, business configuration, custom extensibility, and limited UI automation features. As such, many applications and services do not offer sufficient customization options to modify those applications and services to an extent desired by a user thereof. Moreover, rebuilding applications and services requires a profound understanding of the underlying processing logic for the applications and services, the extent of which may not be known or accessible to users (e.g., cloud customers who cannot take a closer look at the implementation details of their consumed services). Also, the manual rebuilding of services is not efficient, implies high costs, and is an error-prone process.

Accordingly, it would therefore be desirable to provide a framework or infrastructure to recompose or combine various aspects of an existing service to develop new services based on the existing service to, for example, provide specific services for a given user.

BRIEF DESCRIPTION OF THE DRAWINGS

FIG. 5 is an illustrative tabular listing related to an infrastructure herein, according to an example embodiment;

FIG. 6 is an illustrative tabular listing related to an infrastructure herein, according to some example embodiments;

FIG. 7 is an outward facing UI related to an infrastructure herein according to an example embodiment;

FIG. 8 is an outward facing UI related to an infrastructure herein, according to some example embodiments;

FIG. 9 is an illustrative example of an OData service request, according to an example embodiment;

FIG. 10 is an illustrative example of a SQL (structured query language) trace, according to some example embodiments;

FIG. 11 is a table listing of values, according to an example embodiment;

FIG. 12 is an Odata response listing, according to some example embodiments;

FIG. 13 is a mapping table of fields, according to an example embodiment;

FIG. 14 is an Odata metadata listing, according to an example embodiment; and

FIG. 15 is a table listing of values, according to some example embodiments;

FIG. 16 is a definition listing, according to an example embodiment;

FIG. 17 is a core data service (CDS) view definition listing, according to an example embodiment;

FIG. 18 is a CDS view definition listing, according to an example embodiment;

FIG. 19 is a CDS view definition listing, according to an example embodiment;

FIG. 20 is a CDS view definition listing, according to some example embodiments;

FIG. 21 is a CDS view definition listing, according to an example embodiment;

FIG. 22 is another is a CDS view definition listing, according to some example embodiments;

FIG. 25 is a table of field mappings, according to an example embodiment;

FIGS. 26A-26C comprise a JSON notation listing, according to some example embodiments;

FIG. 27 is an illustrative SQL select listing, according to an example embodiment;

FIG. 29 is an illustrative CDS extend view entity, according to some example embodiments.

FIG. 30 is an illustrative representation of a CDS metadata extension, according to an example embodiment;

FIG. 33 is an illustrative UI, according to an example embodiment;

FIG. 34 is an illustrative UI, according to an example embodiment;

FIG. 35 is an illustrative definition of a CDS view entity, according to some example embodiments;

FIGS. 36A-36D comprise an illustrative mapping information, according to an example embodiment;

FIG. 37 is illustrative listing of an instance binding, according to some example embodiments;

FIG. 38 is an illustrative request representation, according to an example embodiment;

FIG. 39 is an illustrative SQL select representation, according to some example embodiments;

FIG. 40 is an illustrative representation of a response payload, according to an example embodiment;

FIG. 42 is an illustrative UI, according to an example embodiment;

FIG. 44 is an illustrative OData service request call representation, according to some example embodiments.

FIG. 45 is an illustrative representation of a traced action invocation, according to an example embodiment;

FIG. 46 is an illustrative representation of a traced action invocation, according to an example embodiment;

FIG. 47 is an illustrative listing for the mapping of function invocations, according to an example embodiment;

FIG. 49 is an illustrative Odata service request, according to an example embodiment;

FIG. 50 is an illustrative trace data representation, according to some example embodiments;

FIG. 51 is an illustrative representation of a traced action invocation, according to an example embodiment;

FIG. 52 is an illustrative traced read request, according to some example embodiments;

FIG. 53 is an illustrative traced create request, according to an example embodiment;

FIG. 54 is an illustrative traced update request, according to some example embodiments;

FIG. 55 is an illustrative representation of service mapping information, according to an example embodiment;

FIGS. 57A-57C comprise a representation of mapping information, according to an example embodiment;

FIG. 59 is an illustrative representation of mapping information, according to some example embodiments;

FIG. 60 is an illustrative process flow, according to an example embodiment.

DETAILED DESCRIPTION

The following description is provided to enable any person in the art to make and use the described embodiments. Various modifications, however, will remain readily apparent to those in the art.

In some aspects, a use case for the systems and methods disclosed herein may include the development of new services based on existing services. In some aspects, embodiments of the present disclosure might enable a user (e.g., users ranging from an unexperienced business users being assigned UI applications for their daily work processes to professional developers with sophisticated technical/development skills) to efficiently develop new services and applications that are optimized for executing processes and tasks desired by the user. In some aspects, some embodiments herein provide mechanism(s) that extent beyond merely adapting a service but instead include recomposing a service.

In some embodiments, systems and methods disclosed herein may provide functionality to compose new services and corresponding interfaces from existing services based on mapping information that is derived from, for example, available service metadata (e.g. metadata of data model views, for example, CDS view metadata in SAP S4HANA) and other sources including, for example, business semantics (e.g., from natural language processing, etc.). Mapping information including this designtime information may be enriched by information extracted from traced interactions with the existing services. In an effort to achieve a harmonized and efficient development process for arbitrary users, the services, via their APIs consumed by users interacting with the system, may be recorded in their specific consumption domains (e.g., UI, Web service integration, ABAP workbench etc.) and mapped therefrom. For example, a new UI application may be derived from a set of standard UI applications that an end user engages with while performing his work.

Figure 1A:
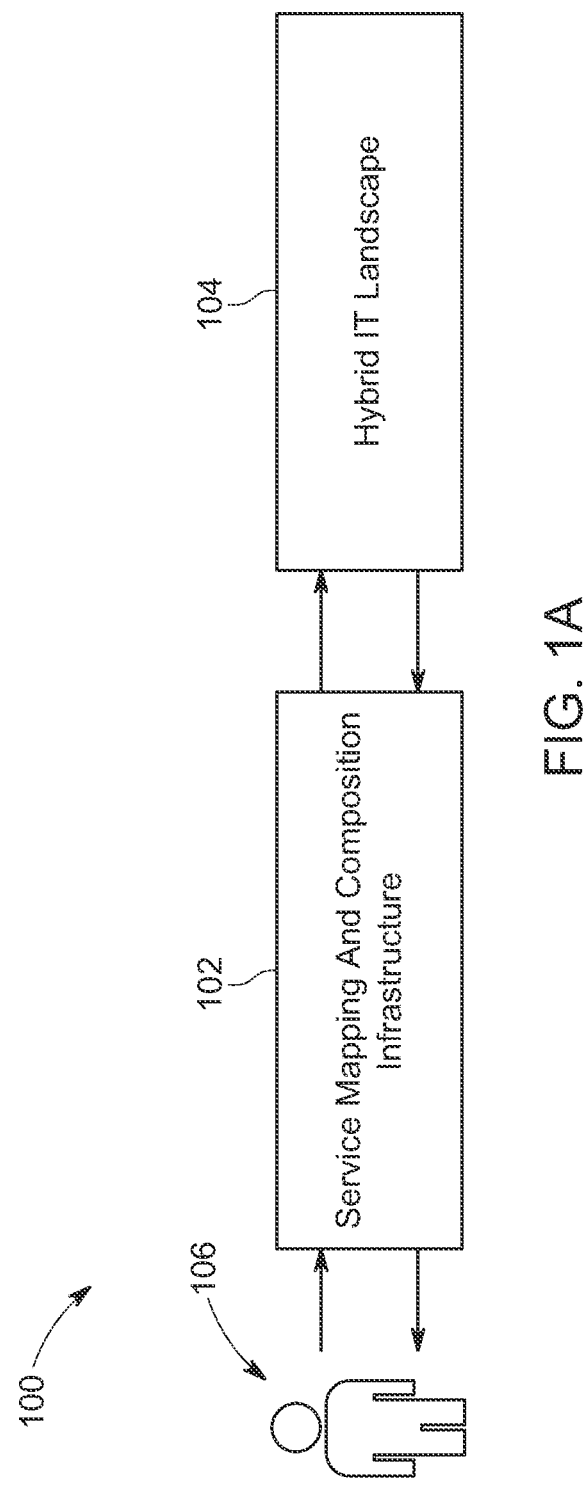
FIG. 1A is an overall schematic block diagram 100 for a system, in accordance with an example embodiment herein.

As a brief introduction to some aspects herein, FIG. 1A is an overall schematic block diagram 100 for a system, in accordance with an example embodiment herein. A service mapping and composition infrastructure (SMACI) 102 is shown interfaced with a hybrid IT landscape 104. In some aspects, SMACI 102 (also referred to herein simply as the "infrastructure") may be configured to provide functionality to compose new services and corresponding interfaces from existing services based on mapping information derived from, for example, the available service metadata, service interactions, and business semantics for services and solutions provided by a hybrid IT landscape 104. Requests to compose a new service based on an existing service, recompose an existing service, or other actions may be received by infrastructure 102 from a user 106. Replies to such requests, including presentations including representations of one or more aspects of the requested new service, extended service, etc., may be returned to the user from the infrastructure.

In some aspects, service mapping information provided by the systems and methods disclosed herein (also referred to as the disclosed "infrastructure" herein) may be useful for composing new services and enhancing existing services, as well as also obtaining an understanding of the general process flow of a service (i.e., deriving insights into the process to better understand the existing infrastructure so that the infrastructure might be better utilized). Such gained insights might be leveraged and provided as a supplementary documentation/explanation component of an application and their associated services.

In some aspect, the systems and methods disclosed herein may support, based on its mapping information, both generating extensions and composing new services (in addition to flexibly composing and executing service requests in an ad hoc manner). The disclosed infrastructure may also support schedule batch executions for recurring tasks, and, for example, to provide code snippets for speeding up manual development activities and the creation of automated tests.

Figure 1B:
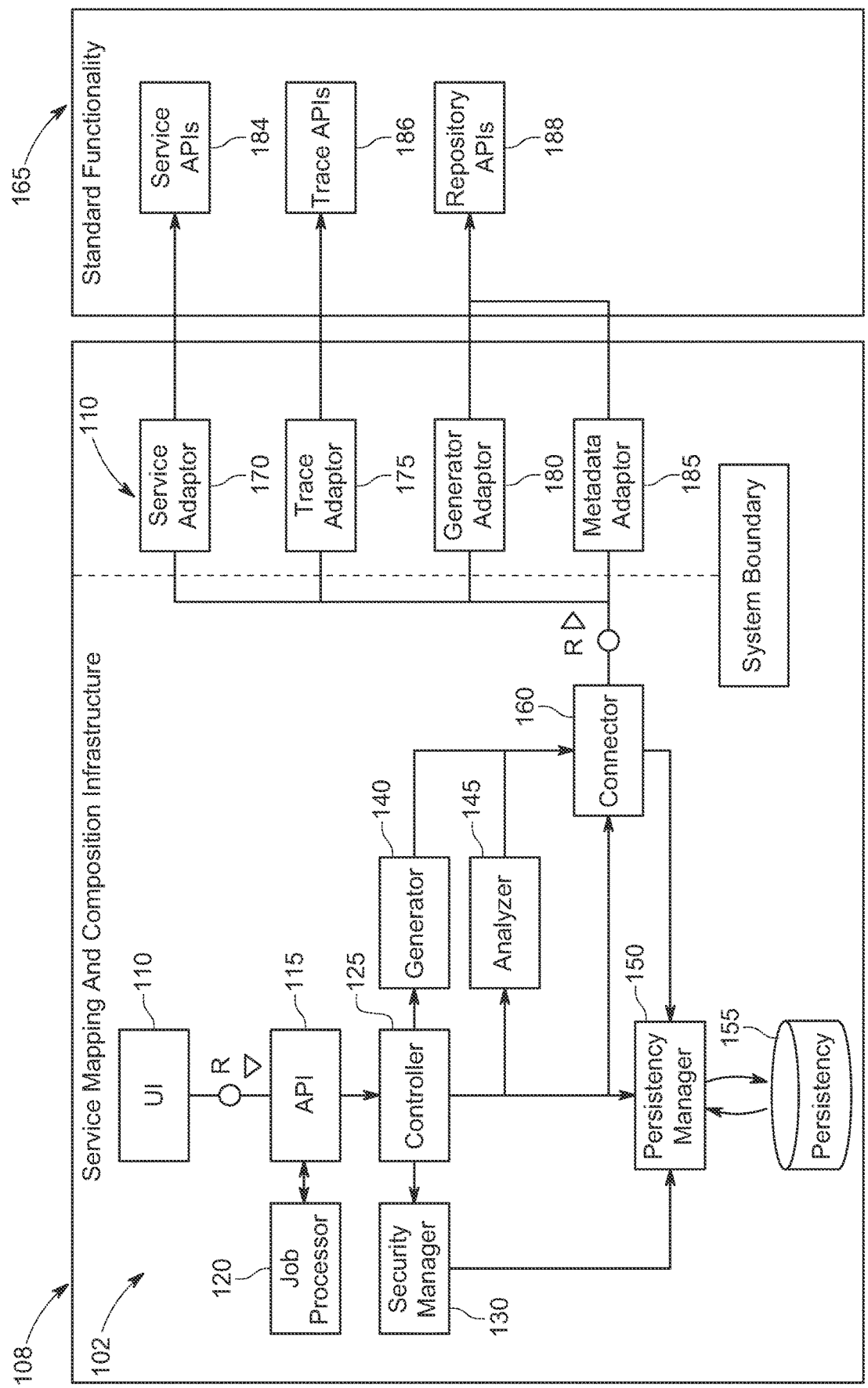
FIG. 1B is an illustrative depiction of a system architecture, according to an example embodiment.

FIG. 1B is an illustrative depiction of an overall architecture 108 for some embodiments of the systems and processes disclosed herein (i.e., the architecture). In some embodiments, the disclosed infrastructure 102 may be realized as a standalone service (e.g., on a cloud-based technology platform) that connects to foreign systems for fetching trace data and metadata or integration into the system providing one or more services 165. Referring to the example embodiment of FIG. 1, a number of components of infrastructure 102 are illustrated for a remote configuration scenario, where connections to foreign systems 165 might be accommodated via standard communication and interface functionality depicted at 110. UI component 110 exposes the entire functionality of the infrastructure 102 to end users (e.g., user 106 in FIG. 1A). UI component 110 may comprise several UI applications that are tailored for supporting individual use cases. Additionally, a generic UI player that allows users to interact with the generic services offers by infrastructure 102 may be provided. In some embodiments, all functionality of the infrastructure 102 may be wrapped by local and remote enabled interfaces enabled by API 115. API 115 may be used by the UI applications 110, but might also be invoked programmatically from consumers of the infrastructure. The latter of which may use system local or remote (e.g., http, . . . ) access to the functionality of infrastructure 102. Job processor 120 provides functionality to manage the scheduling and execution of the infrastructure functionality in background jobs. Controller 125, in some embodiments, may be primarily responsible for orchestrating the service processing, enforcing required authorizations, as well as handling of the transactions. Security manager 130 may handle all authorization and authentication related aspects within the infrastructure, as well as defining additional or completely new authorizations for newly composed services. In some instances, by default, the authorization checks of the reused services may be applied if other security features are not applied. Generator 140 controls the creation of development artifacts generated by infrastructure 102 (e.g., the creation of CDS views and OData services, as discussed below). An analyzer 145 may functionally be responsible for evaluating traces, metadata, and other mapping information and further deriving service mapping information based on the mapping information. Persistency manager 150 may manage all accesses to the local persistency 155 of infrastructure 102. In some instances, persistency 155 may include a set of database tables that store configuration and user settings, as well as mapping information. Persistency 155 may serve for persisting replica of trace data and metadata. In some embodiments, persistency 155 might primarily handle mapping information. In some cases, existing and accessible trace data and metadata describing service interfaces might not be replicated to the infrastructure 102, but read on demand. Still referring to FIG. 1, connector 160 may function to establish connections to adapters of the infrastructure, where the latter may be defined locally or in foreign systems 165. Adapters herein may serve as connection points for embedding foreign functionality into infrastructure 102. Examples of some adapters herein include adapters 180, 185 to establish connections to a repository APIs 188 for reading and writing metadata, service adapters 170 to connect to service APIs 184, and adapters 175 to connect to traced information via trace APIs 186. In some aspects, an adapter might be used when a generic player functionality of infrastructure 102 is used.

When composing a new application or service in some embodiments, the individual service invocations may typically need to be correlated (e.g., input parameters of a new interaction step need to be mapped onto the results or context data of the previous step). For example, if a new record is created in a first step that is updated in a next step, the identification of the new record needs to be extracted from the response of the first service call and afterwards passed to the next service call. An infrastructure analyzer herein might search for corresponding patterns and suggests related matches from metadata, business semantics, and traces of interactions with existing applications and services. The interaction traces might be particularly relevant for deriving insights into encapsulated business logic (i.e., a system or service is viewed as a "black box") that is applied in the course of processing service requests. The relevant trace information may originate from service interactions on standard or otherwise well-defined protocol levels like OData. For improving the automatically derived results of the traces, the interaction steps may be recorded multiple times in order to increase the data baseline. This type of "training" may allow for the identifying of patterns more precisely. For instance, input data that does not change over a series of recordings may be considered to be relatively constant and as such may later on be hidden from end users, whereas frequently changing data may benefit from additional user input and may be rendered as input field(s) when composing new UI applications and services.

In some embodiments, infrastructure herein (e.g., its analyzer) merges all available information for deriving mappings of the various services and parts thereof down an entire application stack. The user of the infrastructure herein might, in some embodiments, refine the automatically derived mappings. This fine tuning may allow the incorporation of further knowledge and preferences of the user. In this context, the application composing user might also define whether additional interaction steps shall be introduced. The infrastructure herein may also allow the defining of additional logic as a break-out scenario (e.g., by means of a rule engine or code exit). Furthermore, it may allow for the replacement of certain features of an application (e.g. a "hard coded" constant language code "E" (English) of a traced API call might be replaced by the logon language of the user in order to cover a more general use case). In some embodiments, machine learning may be applied for further improving the quality of the automatically derived mappings. However, even if machine learning is applied for deriving suitable defaults, processing steps, etc., the finally realized services should still apply a well-defined, comprehensible, stable and thus auditable logic.

In some aspects, the mappings (also referred to as mapping information herein) may be captured as an abstract definition of service operations that cover different service operations (e.g., create, read, update, delete and execute (CRUDE) operations). When composing new services/applications, statically or dynamically, these definitions may be used to realize the service requirements of the users on the requested concrete technical protocol level, such as an OData level.

Figure 1C:
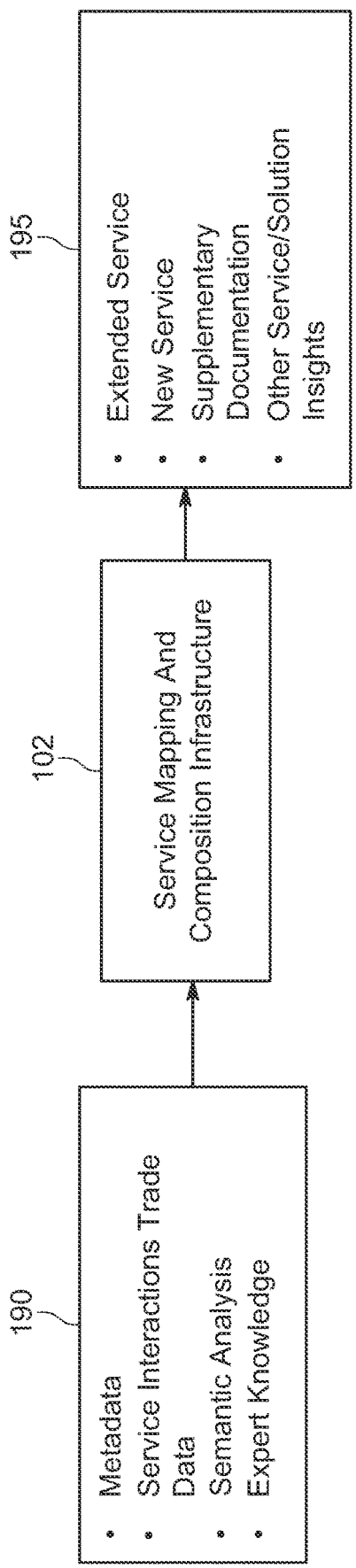
FIG. 1C is a schematic block diagram related to systems and processes disclosed herein, including an example of FIGS. 1A and 1B according to some embodiments.

FIG. 1C is a schematic block diagram related to systems and processes disclosed herein, including an example of FIGS. 1A and 1B according to some embodiments. In some embodiments, FIG. 1C provides an overall representation of some of the types of information 190 that an infrastructure disclosed herein might process or otherwise use to generate one or more of the outputs 195. In some instances, as will be disclosed in greater detail hereinbelow, infrastructure 102 may be responsible for and capable of determining some or all of the metadata of services, the trace data based on interactions between the services, further semantic analysis of the data structures and data sets associated with the services, and expert knowledge (e.g., inputs and other data provided by a user in addition to or perhaps to override automatically determined/derived information) that may be encompassed by 190. Outputs of infrastructure 102, including revised services based on an existing service, new composed services based on one or more existing services, supplementary documentation (e.g., reports, charts, visualizations, etc.), and other service and solution insights determined by the infrastructure may be presented to a user, other systems or services, and persisted in a persistency for further analysis, processing, presenting, and other functions and uses.

While previously there were a couple of techniques for adjusting UIs, such as UI personalization, and for adjusting services such as predefined extension points and configuration options, such techniques were very limited in scope and functionality.

Some embodiments herein provide an approach that offers adaption capabilities that go far beyond these kind of adaptions by creating truly individualized services and applications on demand. The services and applications provisioned by the infrastructure herein not only increase the efficiency of the users on executing their tasks but also helps in reducing the system load and thus decreasing total cost of ownership, TCO, by optimizing the overall task executions. This may be achieved by the infrastructure herein combining and pushing logic down an application stack. This makes the infrastructure herein very flexible and efficient since, for example, communication overhead and unnecessary processing steps may be eliminated. Furthermore, as the new generated services can be tailored and assigned to individual users service authorizations may be handled more easily.

To the extent that previous automation on a UI level may have been realized by recording and replay capabilities, such functionality was oftentimes unstable, as it was based on anchor points and services that may change at any time. As a result, the previous attempts for automation logic required frequent adaptions.

In contrast, the infrastructure disclosed herein leverages stable services that the UI services are based on when composing new applications. Thus, even if incompatible changes occur later on, the updated mapping information generated herein may be used for recomposing the applications and services automatically, which may not have been possible by previous UI services.

In some embodiments, systems and methods herein may relate to business related services and executable processes that may be bound to or work upon "business objects". As used herein, the term "business object(s)" may, in general, include two aspects. In a first aspect, a business object (BO) is a data structure with an associated behavior definition and functions. For example, the BO "SalesOrder" 205 in FIG. 2 has fields with attributes such as "SalesOrder Type", "KeySalesOrderID", "KeySalesOrderItemID", etc. and the BO "Product" 210 in FIG. 2 has fields with attributes such as "KeyProductID", "KeyLanguageCode", "ProductName", etc. The description of the attribute fields comprises metadata such as their names, technical types including lengths, properties such as read-only and mandatory. In a second aspect, a business object is a particular data set according to the data structure (i.e., an instance, instantiation, of the BO in the first aspect) and offers services on top. For example, a seller has received a purchase order with a particular ID number, a quantity (to provide four computers), a time frame ("May to July 2023"), etc. and performed an action to validate that the entered data is consistent prior to saving it. The aspects relate to design-time (first) and to run-time (second) of the BO.

Business objects may represent real-world objects that can be instantiated independently from one another. They may be defined as a composition hierarchy of nodes, respectively entities, and encapsulate the core logic of an application.

Services in a business system (e.g., an ERP system) might typically derived be from representative business objects or act upon them. Therefore, aspects of the present disclosure may focus on business object related services. However, it is noted that the subject matter of the present disclosure is not restricted to services that are based on business objects. Instead, the present disclosure can also be applied to services that are not related to business objects.

Figure 2:
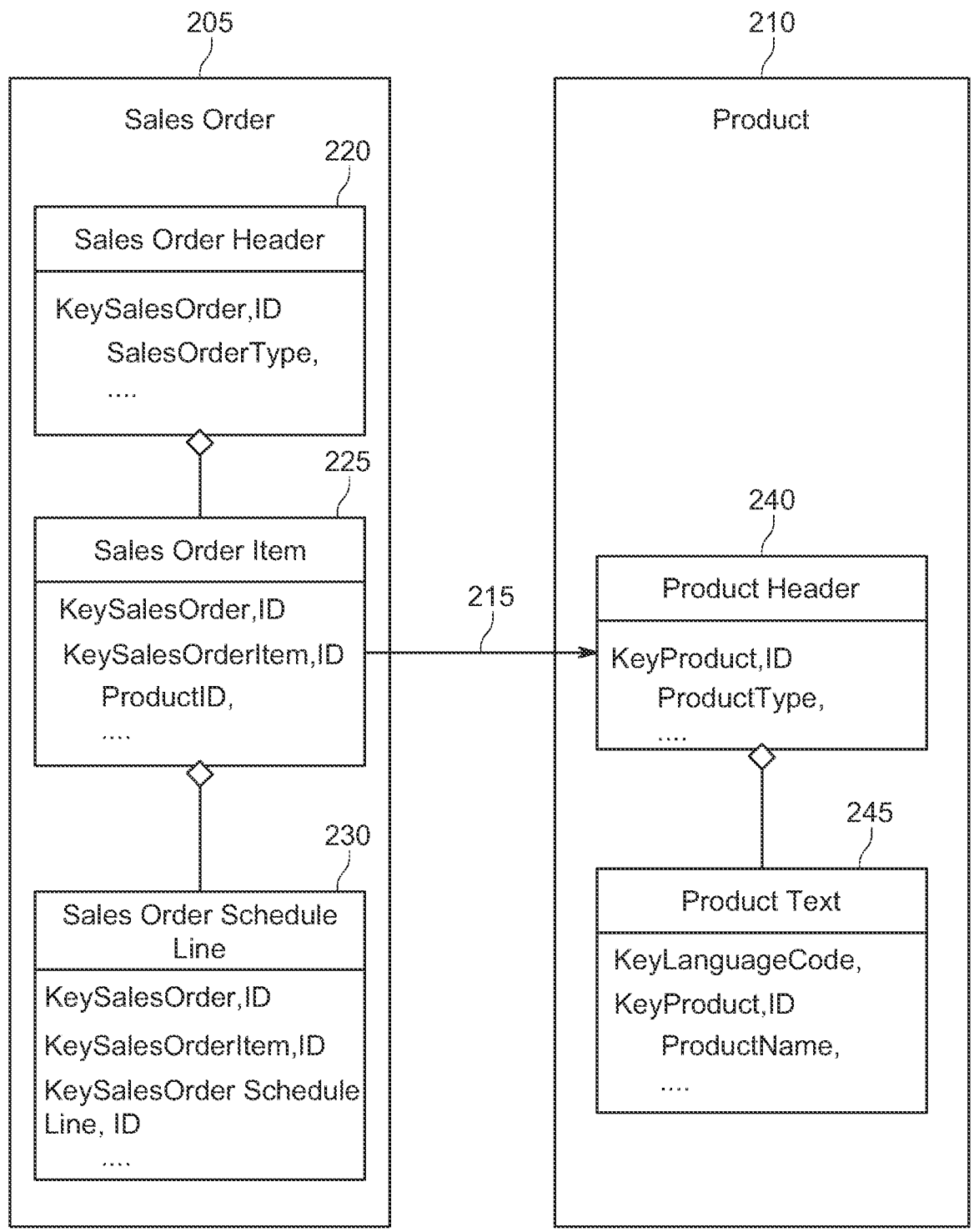
FIG. 2 is an illustrative example of business objects, according to an example embodiment.

Two examples of business objects are illustrated in FIG. 2, including a sales order BO 205 and a product BO 210. Their (simplified) entity relationship model (ERM) is depicted in FIG. 2.

In this example, sales order business object 205 consists of several entities such as the header, item, and schedule line. These entities are related via compositional associations and define several attributes along with a key that uniquely identifies a single instance/record of the entity. Besides the compositional relationships, the entities also have other relations (e.g., foreign key relations) to entities. This aspect is illustrated by the association 215 from the sales order item entity 225 to the header entity 240 of the product business object that in turn has a compositional relationship to the product text entity 245.

These business object models may exist on multiple levels within an application stack. For example, an UI application may display the data of a complete business object instance reflecting its structure (e.g., an instance of a sales order showing its header 220, item 225, and schedule line data 230 in interconnected UI controls). At the other end of the application stack, the database may define a corresponding relational database table schema for persisting the data of the individual entities of the business objects.

Figure 3:
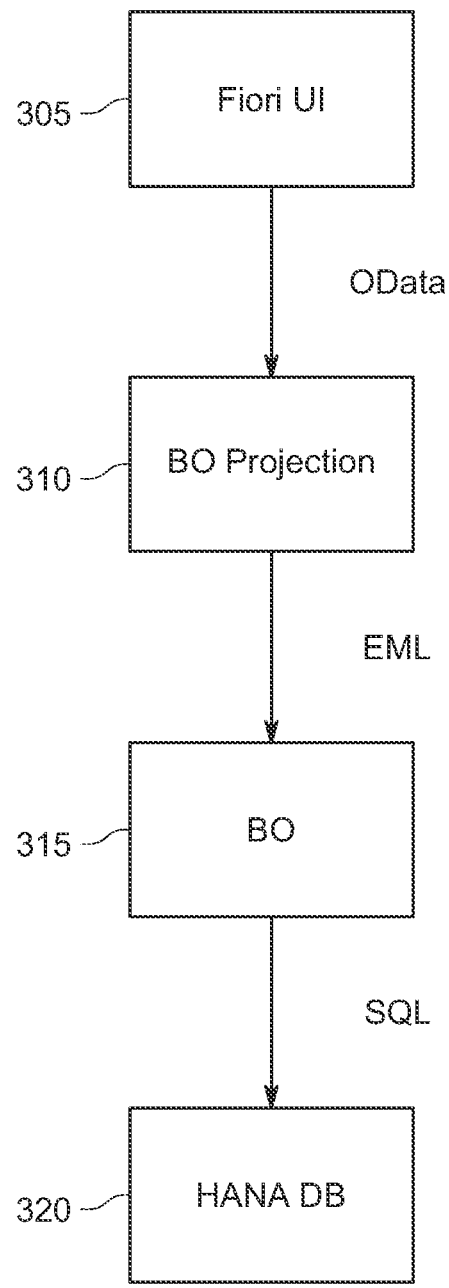
FIG. 3 is an illustrative example of an application stack, according to an example embodiment.

In a programming model (e.g., an SAP RAP (Restful ABAP Programming Model) representation, the application stack may look as shown in the example of FIG. 3. The application stack depicted in FIG. 3, including a UI 305, a BO projection 310, a BO 315, and a database layer 320, might be representative of many different applications. In FIG. 3, both the data and operation flow are based on service invocations between the different representations/realizations of the business objects within the application stack. The infrastructure (i.e., system and methods) disclosed herein establishes mappings between the different services down to the detailed aspects of the BO models (entities, relations, fields and operations).

For the mapping of service, a service herein may be any "public" accessible functionality on any stack level, including, for example, DB procedures, BO core services, OData services, Ul transformation definitions, modeled determinations, etc. It is not necessary to know the implementation details of these services. Instead, each service implementation may be handled like a "black box" by the infrastructure disclosed herein. However, in some instances it may be expected that each service interface is well defined/modeled and mappable. Furthermore, each service's functionality has to be reusable in a given domain. In some respects, the infrastructure disclosed herein may technically provide an option for setting up an environment/context in which the service itself can be invoked (e.g., in order to invoke a DB service from the UI application some glue code is required).

Figure 4A:
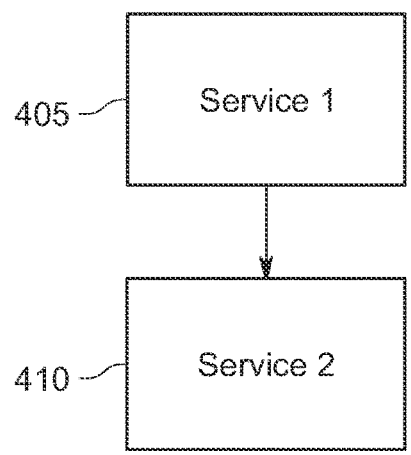
FIGS. 4A and 4B are illustrative examples of service delegations, according to an example embodiment.

In a simple scenario, depicted in FIG. 4A, a service maps onto another single service by merely delegating the service request of its consumer. In this case the services are interchangeable (i.e., the invocation of the delegating service 405 can, function-wise, be replaced by the delegee service 410). While seemingly very simple, such delegations are quite common.

Figure 4B:
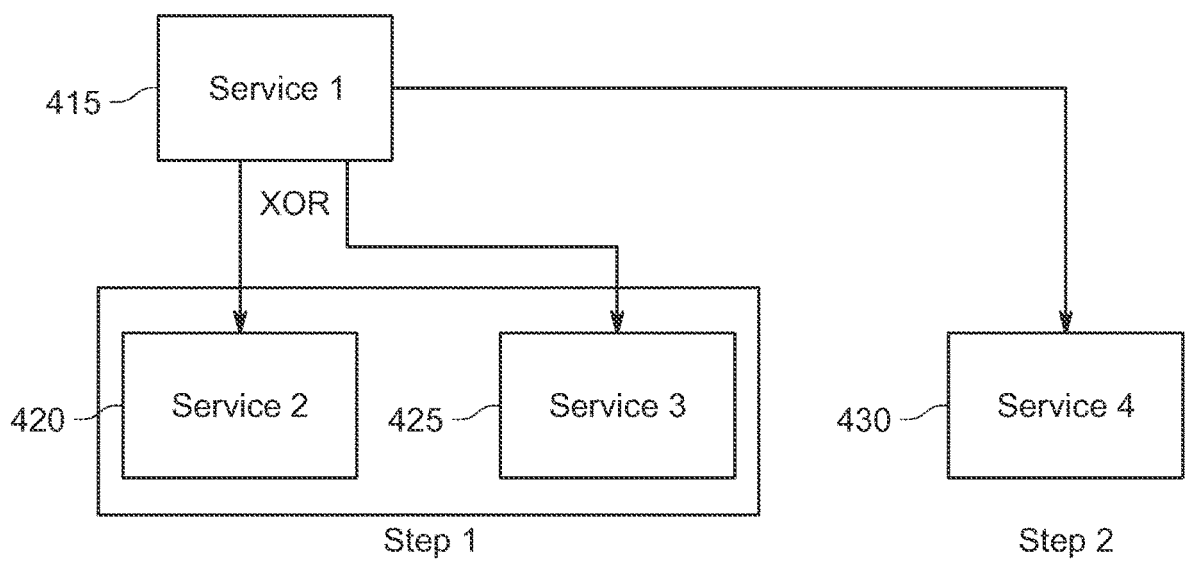

The infrastructure disclosed herein can also cope with mapping services that invoke multiple other services, including depending on conditions and applying specific choreographies of calls, as illustrated in FIG. 4B. As an example, service 1 (415) might first determine whether it is to invoke service 2 (420) or service 3 (425), and thereafter it may proceed to invoke service 4 (430).

Within the processing of the business application logic business object entities, respectively their instances play an important role. For example, they act as a special unit that can be accessed and maintained as a whole (i.e. all the entity's fields are tightly coupled and updated for an entire record/instance). Similar to the mapping of their embedding services, business object entities may simply be mapped one on another or require some other sophisticated handling when a single entity is bound to multiple other entities.

Entity instances are individual data records of an entity. They may be identified by their key values. Therefore, a mapping of instances is defined by correlating keys of the involved entities. In this context, even if there is a simple 1:1 mapping of entities, this does not necessarily hold true for their instances also.

In general, instance relations can be influenced by dataset oriented operations such as, for example, Union, Aggregation, and Filtering. As such, the infrastructure disclosed herein, and the mapping of instances performed thereby, may be configured to capture these operations.

The mapping of relations of entities is also supported. Relations have various properties, such as Name, which identifies the relation;

Type, which defines the kind of relation such as compositional relations;

Source Entity, from which the relation starts;

Target Entity, to which the relation points to;

Target Multiplicity, which defines how many (minimum and maximum) instances of the target entity may or are related to a single source entity instance; and Conditions, which defines how target instances are bound to source instances.

From the perspective of the infrastructure disclosed herein, the mapping of relations considers all of the properties in order to avoid mapping errors. For instance, a compositional relationship is not the same as a standard association since it also implies a strong dependency of the existence of the child instance from its parent instance. However, for many use cases of relations, some of the most important information is based on the mappings of their source and target entities and an evaluation of their conditions.

The fields of business objects may also be mapped. Field mappings represent the most fine-granular mapping information captured by some embodiments of the infrastructure disclosed herein.

Now discussed will be a closer look at how a mapping may be built in an example infrastructure herein. Referring to a completely modelled application stack, the mapping of fields from the UI down to the persistency can be extracted from the given metadata. For example, in SAP RAP applications, the read functionality is completely modelled and respectively implemented according to defining OData services based on the Service Adaptation Definition Language (SADL) infrastructure that maps OData entity types and their properties onto Core Data Services (CDS) views and their fields, which in turn project database fields in a declarative manner.

If such a well-defined technical mapping is not captured in the metadata, the mapping might be derived from semantical mappings by applying algorithms that evaluate relations of the natural language. In this context, fields, respectively terms like "Material", may be determined to be related to "Product", "ProductStatus" may be considered a specialization of "Status", etc.

Apart from such metadata driven approaches, systems and methods herein may also try to relate the fields from traced data flows. For example, a method might check via which fields of an entity a user input value was passed through the application logic during modify operations and/or via which fields the persisted data value was transferred during read operations. Such evaluations of runtime traces may have to consider different type systems, such as, for example, the primitive types of SAP ABAP and the EDM types of OData depicted in the table of FIG. 5. In table 5, trace data revealed ABAP values that correlate to specific Odata level data, where an "X" in ABAP equates to the Boolean "true" in the Odata. The evaluation of trace data may also consider the applied input and output conversion logic, such as the TRIM, ALPHA or UPPER CASE conversions that are shown in FIG. 6. Both of these factors have an impact on the values to be compared and correlated.

In some aspects, in general, the most reliable mappings might be derived by using all of the available designtime and runtime information. In some instances, as required or desired, a final refinement may be performed by a consumer of infrastructure disclosed herein, thereby possibly overruling some of the automatically derived information.

Services might perform different operations. As such, an embodiment of the infrastructure disclosed herein may be configured to capture mappings for the following operation types including READ, CREATE, UPDATE, MODIFY (Conditional CREATE or UPDATE), DELETE, and EXECUTE.

Of these operations, the first five operation types represent standard operations with a well-defined semantics. In contrast, operation type EXECUTE bundles those operations, which cannot be associated to one of the first five operations. These operations are sometimes referred to as actions and/or functions. They may result in data manipulations or mere provisioning of data and typically have a handcrafted implementation.

Sometimes the operations to be mapped can be derived from pure metadata evaluations. This is specifically true for the READ operation. Often though, the metadata does not cover all relevant mapping information, and traces may be applied for fully deriving mappings. Sometimes, even with the traced data, the captured mappings may not be precise enough or they may be too complex to be handled in a declarative way. In such cases, the infrastructure disclosed herein offers the provisioning of exits, which programmatically capture the overall mapping information.

In some embodiments, the static mappings captured by an infrastructure disclosed herein are typically providing delta information to the already available metadata of the services. The latter is effectively being used/evaluated when composing new services. This may be particularly true for data changing services, for which properties such as "update enabled", "read-only", and "mandatory" may need to be considered for successfully executing operations in newly composed services.

Figure 7:
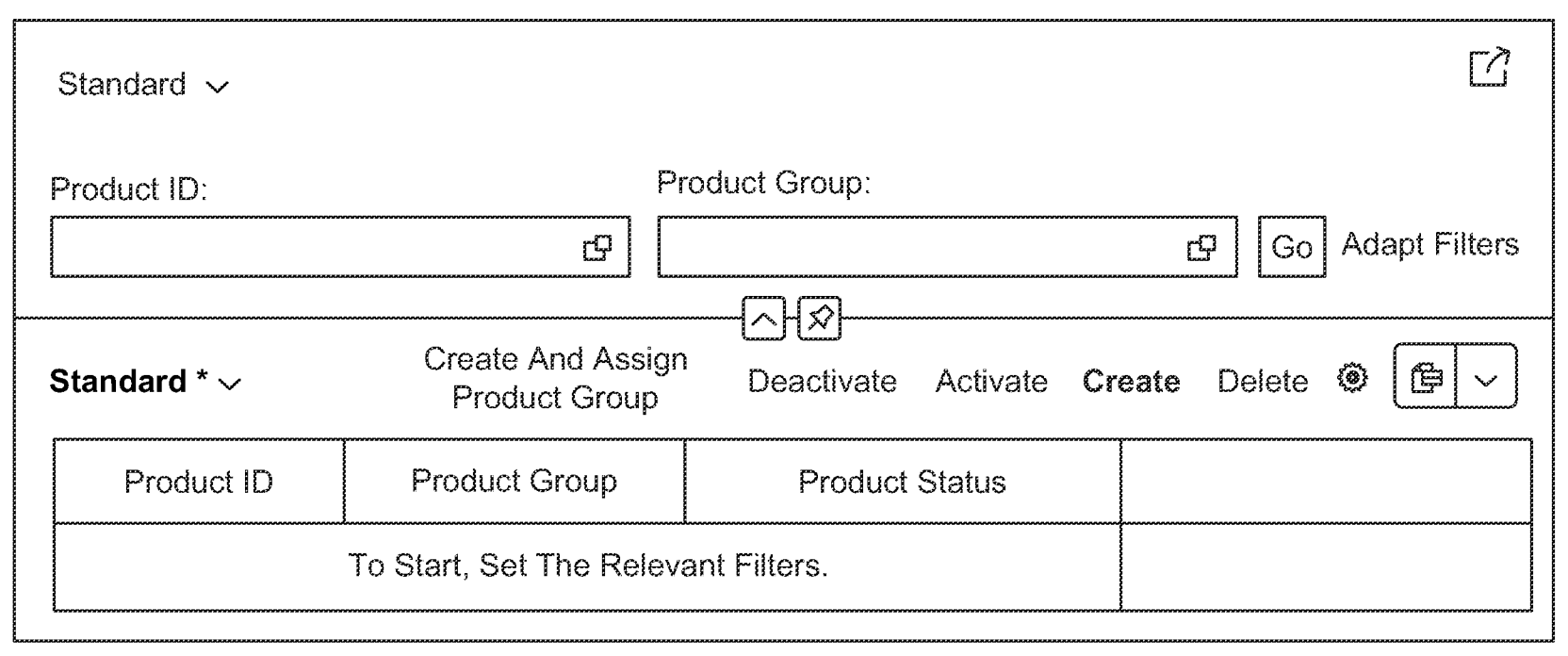

A number of different use cases will now be discussed to illustrate various features of the systems and methods disclosed herein. One type of use case relates to read only scenarios. In this example, let's assume that "users" refers a user of an application which displays products. When launching the application, the initial UI display may look as shown in FIG. 7. Let's further assume that the user does not know how the underlying application stack is defined. In order to get insights into the underlying business logic, the user may, for example, switch on a browser trace feature as well as an SQL trace on the application server and start performing interactions on the UI.

Continuing with this example, the user enters a filter condition "PC_*" for the filter field "Product ID" and "PC" for the field "Product Group" and execute a query by pressing "Go", as depicted in the UI shown in FIG. 8 for the sample application.

Now, reference is made to recorded traces. Therein, the mere data flow is focused on. According to the browser trace, the sample UI application (e.g., SAP Fiori UI) issued a POST request against the OData service provider as shown in FIG. 9.

From the passed filter values, the system can conclude that the UI filter fields "Product ID" and "Product Group"

are bound to the OData properties "ID" and "GroupID" of OData entity set "ProductEntity" of the OData service version " . . . /VDMDEMODM_UIV2_PRODMANAGE; v=0001/".

On the other end of the traced call stack, the SQL select statement illustrated in FIG. 10 is encountered. As seen, what can be extracted is that the accessed database entity related to the OData entity set is called "VDMDE-MODM_C_PRODUCTMANAGE" (1005), which fields "ID" and "GROUPID" map onto the OData properties "ID" and "GroupID".

Now, looking at the responses of the two requests, the SQL selection result might look as shown in FIG. 11. Furthermore, the corresponding OData response might look as illustrated in FIG. 12.

By matching the values between the SQL result with the Odata result and the UI display, the field correlations shown in FIG. 13 are derived.

By taking a closer look at the metadata of the OData service provided by a call such as https:// . . . /VDMDEMODM_UIV2_PRODMANAGE/$metadata, the definition of the used OData entity type "ProductEntity-Type" is seen as illustrated in FIG. 14.

This metadata confirms findings from the trace. For instance, it reveals that the OData property "ID" has the label text ("sap:label") "Product ID" and that it has a text relation ("sap:text") to the OData property "Name". The UI table control leverages this information for combining both values in a single column, i.e., for constructing the displayed value by applying the pattern <ID> (<Name>) e.g. "PC_2 (Workstation)", as illustrated in FIG. 8.

There is also metadata available for the used data source "VDMDEMODM_C_PRODUCTMANAGE", which can be retrieved from a repository of APIs of the hosting (e.g., SAP ABAP) system. In the present example case, the entity "VDMDEMODM_C_PRODUCTMANAGE" has the SQL signature depicted in FIG. 15. As demonstrated, both the OData entity and the data base entity share the same key definition. As a result, both fields and entities can be mapped, as well as concrete instances (i.e., records of these entities).

It will now be demonstrated, that if the read access was modeled completely, the corresponding mappings can be derived from the available metadata alone. For illustrating this, the actual data processing logic on SQL level may be scrutinized in more detail. So far, the database entity "VDMDEMODM_C_PRODUCTMANAGE" being directly accessed from the ABAP application server has been identified. Instead of using data base traces for analyzing the SQL processing on the data base system itself in more detail, the fact that the entity "VDMDEMODM_C_PRODUCT-MANAGE" is implemented as a CDS (Core Data Services) view entity might be leveraged. That is, its implementation follows a fully declarative approach from which the metadata for deriving the envisioned mappings can be extracted.

Having a closer look at the CDS view model "VDMDE-MODM_C_PRODUCTMANAGE" (FIG. 16), implemented SQL logic may be focused on. The CDS view entity "VDMDEMODM_C_ProductManage" projects the fields "Product", "ProductGroup" and "ProductStatus" from its primary data source "VDMDEMODM_R_ProductTP" and exposes them as fields "ID", "GroupID" and "Status". In addition, it fetches fields "ProductName" and "ProductStatusText" from associated data sources and exposes them as fields "Name" and "StatusText". The applied path expressions will be discussed below in more detail. Note however that unlike in OData, the names are case-insensitive on the SQL level (i.e., there is no distinction between lower- and upper-case letters, e.g., "GroupID" and "GROUPID").

The used data source "VDMDEMODM_R_ProductTP" itself is defined as another CDS view model, as illustrated in FIG. 17. As illustrated, it projects all of its fields, such as "Product" and "ProductType" from its own data source "VDMDEMODM_I_Product" preserving their names. Note, this view exposes additional fields such as "Product-Type" and "ProductIsConfigurable", that are not being exposed in the CDS model "VDMDEMODM_C_Product-Manage". It also defines and exposes a composition association "_Text" to CDS view "VDMDEMODM_R_Product-TextTP", which is illustrated in FIG. 18.

The CDS view "VDMDEMODM_R_ProductTextTP" exposes the language dependent (key "Language") name "ProductName" and description "ProductDescription" of a product (key "Product"). It engages CDS view "VDMDE-MODM_I_ProductText" as its data source and projects all the corresponding fields.

CDS view "VDMDEMODM_I_Product", which acts as a data source for the before-mentioned CDS view "VDMDE-MODM_R_ProductTP", is defined as illustrated in FIG. 19. Similar to CDS view "VDMDEMODM_R_ProductTP" it merely projects its fields from its own data source "VDMDEMOD_DM_P" 1905, which is a database table, preserving their names. In addition, it specifies and exposes associations "_Text" 1910 and "_ProductStatus" 1915 to the CDS views "VDMDEMODM_I_ProductText" and "VDMDEMODM_I_ProductStatus", respectively.

CDS view "VDMDEMODM_I_ProductText" exposes fields of the database table "VDMDEMOD_DM_PT" 2005, as illustrated in FIG. 20.

CDS view "VDMDEMODM_I_ProductStatus" shown in FIG. 21 selects and exposes equally named fields from its data source "VDMDEMOD_DM_PS" 2105, which is another database table. It defines a compositional association "_Text" to CDS view "VDMDEMODM_I_ProductStatusText" at 2110 and exposes it, too.

CDS view "VDMDEMODM_I_ProductStatusText" shown in FIG. 22 in turn exposes equally named fields from its data source "VDMDEMOD_DM_PST" 2205, which is a database table.

Figures 23, 24:
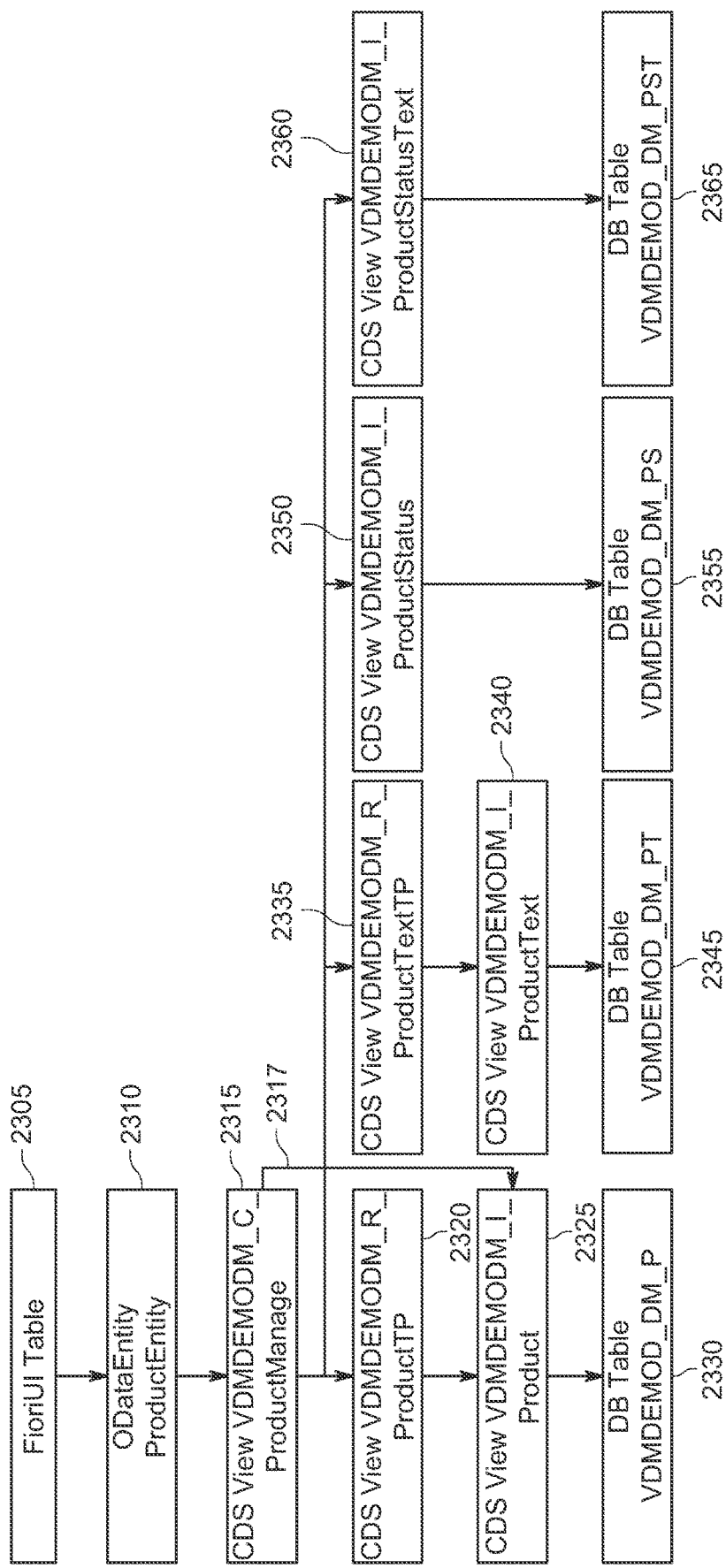
FIG. 23 is an illustrative application stack representation, according to an example embodiment.
FIG. 24 is an illustrative CDS path expression, according to some example embodiments.

Based on this CDS information, the representation shown in FIG. 23 may be derived for the overall data access of the present example's UI application. As demonstrated, based on the disclosed analysis, a mapping can be determined including entities, instances, and fields from the UI application (e.g., 2305) down through an OData layer 2310 and CDS Views (e.g., 2320, 2325, 2335, 2340, 2350, and 2360) down to the fundamental database tables (e.g., tables 2330, 2345, 2355, and 2365).

Whereas most of the fields were propagated from the DB table "VDMDEMOD_DM_P" through the entire CDS view stack as shown, CDS entity "VDMDEMODM_C_Product-Manage" shows two particularities. It applies a renaming of the underlying fields and constructs two additional fields "Name" and "StatusText" by applying the path expressions depicted in FIG. 24.

Technically, the path expressions in FIG. 24 result in left outer joins with the associated views "VDMDEMODM_R_ProductTextTP" 2335, "VDMDEMODM_I_ProductStatus" 2350 and "VDMDEMODM_I_ProductStatusText" 2360, wherein the logon language ($session.system_language) is being used as filter criterion for returning the text values of the fields "ProductName" and "ProductStatusText" in the logon language of the user. Note that the complete filter condition has to take the modelled on-conditions of the CDS view associations into account in addition to the language filter.

Finally, the constructed fields originate from the underlying database tables "VDMDEMOD_DM_PT" 2345 and "VDMDEMOD_DM_PST" 2365. Thus, the derived mere field value mapping may look like the tabular listing in FIG. 25. FIG. 25 is a schematic (i.e., logical) table listing the derived mappings. The mappings might not actually be organized in the manner shown in FIG. 25 in any one data table or other data structure.

The above examples demonstrate how mappings can be derived from traces and metadata. The following includes a discussion how this information might be used in the context of a service mapping and composition infrastructure (i.e., infrastructure) herein.

The infrastructure disclosed captures all of the mappings in its own metadata that serves as an abstraction from the concrete service models and their implementations. This can improve interoperability, make analyses and mappings more efficient, and ease, for example, a reimplementation of services. In some aspects, the mapping information derived by some embodiments herein can also be defined and redefined manually, such that the coverage and conciseness of the mappings might be further improved upon.

For example, the metadata of CDS view "VDMDEMODM_C_ProductManage" may be represented as the object in JSON notation listing shown in FIGS. 26A-26C. Referring to these figures, it seen that the displayed metadata holds the mappings for the entity "VDMDEMODM_C_ProductManage", that can be accessed on the SQL level. The instance bindings keep track of the relations between the service entity and its data sources. In the present example, this is captured by the binding condition "1", seen at 2605. This is an elementary condition specifying that the instances of "VDMDEMODM_C_ProductManage" identified by its key "ID" are the same as the instances of its data source "VDMDEMODM_R_ProductTP" identified by its key "Product", as seen at 2610. Furthermore, the metadata contains information about the field mappings. For example, the field "ID" of entity "VDMDEMODM_C_ProductManage" originates from the source field "Product" of entity "VDMDEMODM_R_ProductTP" (2615). Since the instance binding for this field is the same as for its entity, the corresponding value binding definition can be omitted, as shown in the given example. This is different for the field "Name" (2620), which is bound to the source field "ProductName" of entity "VDMDEMODM_R_ProductTextTP". Values for this field have to be fetched by applying the modelled binding condition "100". This condition (2625) itself represents a group of elementary conditions. Based on the instance binding condition "1", two additional binding conditions "2" and "3" need to be applied (combined by a logical "AND") to map the proper data from entity "VDMDEMODM_R_ProductTextTP" (2630). Basically, the product names returned by this view shall be filtered by the "Product" (2635) and logon language (2640) ("SystemField":"LOGON LANGUAGE"), when incorporating them into the entity "VDMDEMODM_C_ProductManage". Note that this definition is self-contained (i.e., it may directly be translated to a read access). On SQL level, these conditions could be represented by the left outer join shown in FIG. 27.

Similarly, the field "StatusText" (2645) needs to be retrieved from the field "ProductStatusText" of entity "VDMDEMODM_I_ProductStatusText" by applying a dedicated grouping value binding "200" (2650) by a left outer join as defined in the binding conditions.

In some aspects, the disclosed infrastructure tries to capture all available mappings. Doing so allows for the decomposing of existing services and the composing new services by, for example, replacing services with mappable services. For example, if the mapping between "VDMDEMODM_C_ProductManage" (FIG. 23, 2315) and "VDMDEMODM_R_ProductTP" (FIG. 23, 2320), as well as the mapping between "VDMDEMODM_R_ProductTP" (FIG. 23, 2320) and "VDMDEMODM_I_Product" (FIG. 23, 2325) are known, then the direct mapping between "VDMDEMODM_C_ProductManage" (FIG. 23, 2315) and "VDMDEMODM_I_Product" (FIG. 23, 2325) can be derived and a service similar to "VDMDEMODM_C_ProductManage" could be built directly on top of "VDMDEMODM_I_Product", thereby skipping the intermediate CDS view "VDMDEMODM_R_ProductTP" (FIG. 23, 2320) in between as illustrated by the arrow 2317. This provided functionality is essential for supporting different user roles and usage scenarios of the service mapping and composition infrastructure disclosed herein in an optimal way.

A usage scenario will now be discussed wherein a developer dealing with globalization extensions wants to enhance the UI application for managing products with an extension field. However, the developer is not aware whether this is actually feasible and what needs to be done in order to achieve the envisioned extension. Based on the available mapping information, the infrastructure herein may provide a tailored UI application for supporting such extension scenarios, as shown in FIG. 28.

Figure 28:
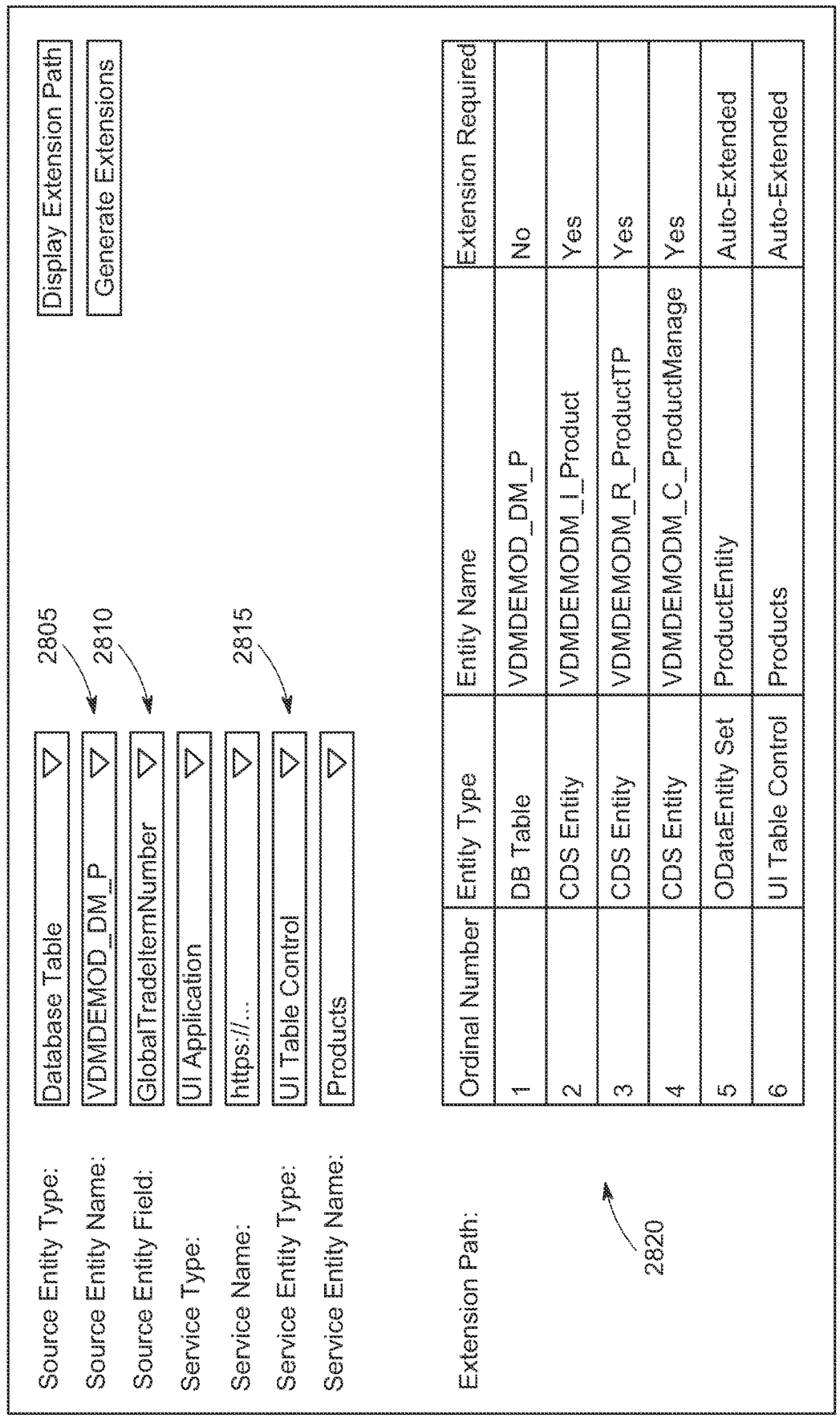
FIG. 28 is an illustrative UI, according to an example embodiment.

In the UI of FIG. 28, the developers may capture the information about the source information like the database table "VDMDEMOD_DM_P" 2805 and the extension field "GlobalTradeItemNumber" 2810 that they want to propagate, as well as the service entity 2815 (UI table control for products) they want the extension field to be incorporated in. Having entered both the source and destination information, the developer may trigger the display of the extension path (i.e., the entities to be extended considering their extension order "Ordinal Number").

If it is technically feasible to perform the extension, the disclosed infrastructure may show which entities need to be extended. In the present example case, three CDS views starting with "VDMDEMODM_I_Product" need to be extended. The extension of the OData service and the UI application happens automatically once CDS view "VDMDEMODM_C_ProductManage" was extended. This is shown in FIG. 28 at 2820.

Figure 31:
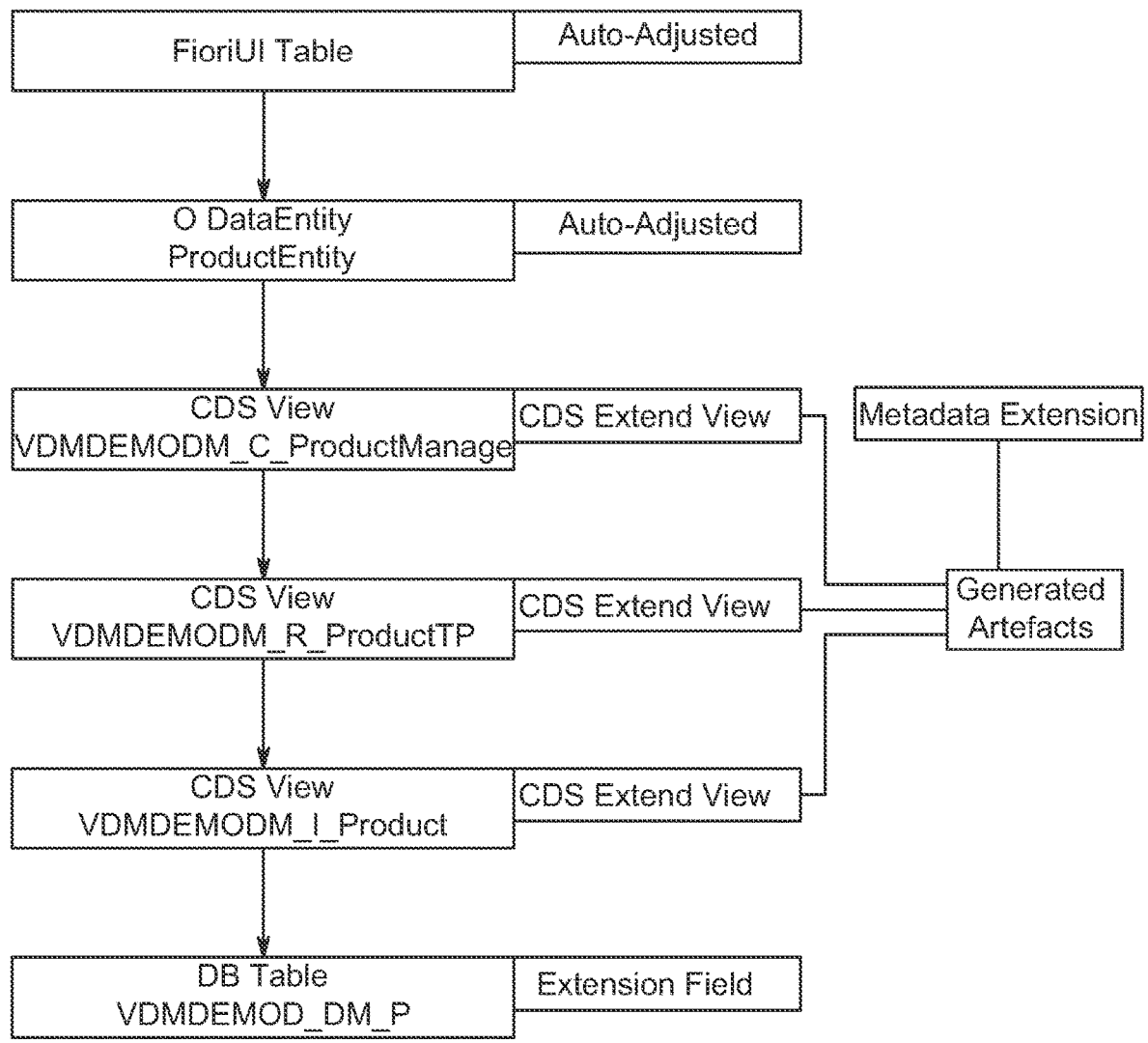
FIG. 31 is an illustrative example of an adjusted application stack, according to an example embodiment.

In some embodiments, in addition to (or as an alternative) from showing the extension path, the disclosed infrastructure might generate the corresponding development artifacts on demand, such as the CDS view extend for CDS view "VDMDEMODM_C_ProductManage" (facilitated by the listing in FIG. 29) and a metadata extension as shown in FIG. 30 for CDS view "VDMDEMODM_C_ProductManage", which shall ensure that the field "GlobalTradeItemNumber" is shown in the product table. Thereafter, an adjusted application stack may look like as shown in FIG. 31.

In some embodiments, while the "explanation" use case above that includes the full mapping of the application stack and the extension use case can be supported by the present disclosure, a main focus of some implementations of the disclosed infrastructure may be the composition of new services tailored to and optimized for specific needs starting (e.g., of a user), from existing services and existing interaction scenarios thereof.

As an example, assume that cloud service customers are not completely satisfied with the previously discussed UI application shipped by a vendor or service provider. They might want to list products with their names and descriptions, type information, and adjust the filter logic for texts in such a way, for example, that the texts in the language of the corporate entity (e.g. "E" (English)) are returned, if they were not otherwise defined, in the logon language of the user. It's noted that such adaptions cannot typically be achieved by simple extension techniques. However, such customizations may be supported by disclosed infrastructure herein.

Leveraging the aspects of the disclosed infrastructure, customers might use the shipped UI application as a starting point for creating their own UI applications. First, they could get an overview about the application stack. Since cloud customers may only use released/stable development objects, the disclosed infrastructure could offer a corresponding view, which eliminates unreleased services from the displayed application stack.

Figure 32:
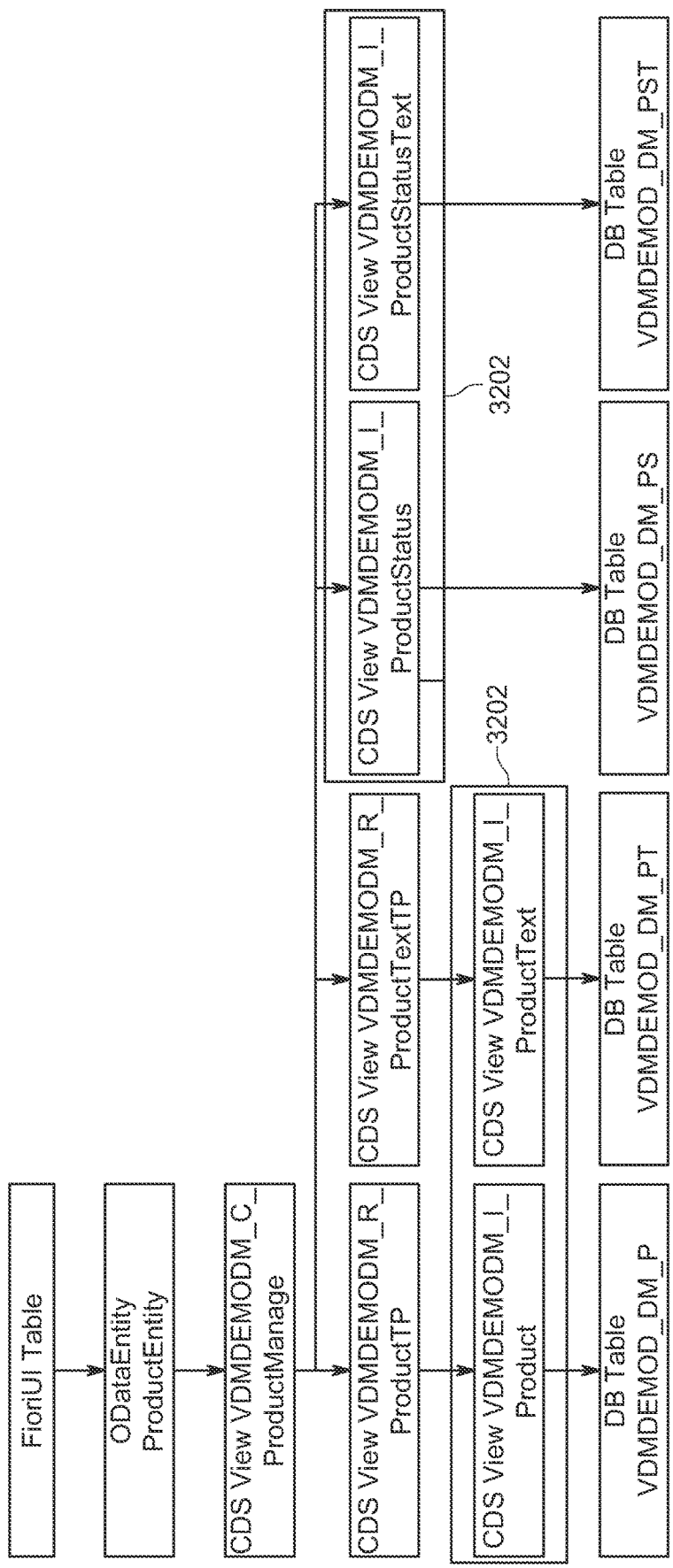
FIG. 32 is an illustrative application stack representation, according to an example embodiment.

In one model, only a subset of views may be actually released for customer usage. This aspect is reflected by the CDS views that are bound by box 3202 in FIG. 32. The corresponding infrastructure perspective view of the example UI application may, accordingly, look as illustrated in FIG. 33.

After selecting the template service entity "Products" via the UI of FIG. 33 and pressing "Display Field Mappings", the depicted table therein is populated with the UI fields of the template application being selected ("Selected"="Yes"), as well as the corresponding conversion logic. In addition, other accessible fields of the mapped entities are displayed without being selected ("Selected"=" "). In addition to the plain field mappings, the expression for complex conversions is also displayed, such as for the service field "(Product ID)" with its conversion "1". The expression syntax used follows the admissible syntax of the artifacts to be generated. In the present example, it represents the already discussed CDS path expression (note that it is being applied on the CDS view "VDMDEMODM_I_Product", instead of the original CDS view "VDMDEMODM_R_ProductTP"; thus the association "_Text" must exist there also).

Based on this template, the user may start composing the service they want to create. The result of their efforts may yield the UI in FIG. 34 that includes the selected fields being adjusted 3405 and the calculation logic being adapted 3410. In addition, all technical field name mappings were removed therefrom, such that the technical UI service field names match the CDS entity field names.

In the present example use case, the user chooses to create another UI application. They might also decide to generate another service type, such as a CDS model or OData Service.

In some instances, the user may save the captured data for later refinements and load this data on demand.

In general, such generated mapping templates could also be defined and shipped by a service provider or vendor and act as a supplementary documentation. This feature may be in addition to the mapping information being used in different infrastructure mapping scenarios.

Continuing with the present example, the user might proceed to generate a new service by selecting the "Generate Service" function 3415 in the UI depicted in FIG. 34. Such action might trigger the generating of all of the required artifacts in the customer namespace (e.g., "YY" including the new data provider CDS view "YY_Products"), as depicted in FIG. 35 shown below.

In some instances, instead of generating a new service, the captured and persisted mapping logic might also be applied dynamically at runtime. In this regard, the disclosed infrastructure may offer a set of generic wrapper services for different protocols, such as OData, for processing the logic and generic player UIs for end users to interact with these services.

As an example, the mapping information for the user input shown above may be represented as shown in FIGS. 36A-36D.

The conditional logic (e.g., FIG. 36D) introduces a nesting of the conditions. Nevertheless, in this example case, the logic may still be expressed statically in the mapping definition.

For even more complex cases, which might likely also apply some programmatic logic, the conditions can also be implemented manually, in a code exit. In such cases, the instance binding might be represented as depicted in FIG. 37.

In some instances, there might even be multiple exists implemented by different means, such as for example, ABAP classes and SQL scripts. Note that the signature of these exits may follow conventions of the implemented infrastructure in order to incorporate them into the processing logic. In addition, the available implementation types might have to fit to the envisioned usage of the mapping later on. For example, if a SQL based service specifies instance bindings with ABAP code breakouts only, then the available infrastructure functionality may be limited since ABAP code might not be executed in the database system. However, if the same mapping is being used for constructing an ABAP based service, the processing may be orchestrated by the disclosed infrastructure in such a way that the ABAP based exit is properly merged into the overall logic.

In some embodiments, the template information may be associated with a unique identifier that is specified when saving the mapping information. For example, assume in a given sample that this identifier is called "YY_PRODUCT_SERVICE". This identifier is passed to the generic service in a request payload along with the type of operation to be performed and in case of a "READ" request, with some optional filter, sort, or other criteria and used to execute the service in its provisioning system. The corresponding request payload may look like FIG. 38. As illustrated, multiple services may be invoked in a single request from the consumer. In some aspects, if sequencing is relevant, a dependency between the individual contained requests can also be specified via "PredecessorRequestID" as shown in the last snippet for data changing operations in FIG. 59. The illustrated payload in FIG. 38 instructs the infrastructure to execute a "READ" operation on the entity "YY_Products" of service "YY_PRODUCT_SERVICE" applying the filter condition "Product" equal "PC_2" and returning values for the fields "Product" and "ProductName".

In some embodiments, the disclosed infrastructure may derive the SQL statement (e.g., in ABAP) depicted in FIG. 39 from the referenced service mapping definition and the concrete request instruction. The payload of the response may be as illustrated in FIG. 40. That is, a single record defined by the product ID "PC_2" and its name "Workstation" would be returned.

In some embodiments for simplifying the usage of the infrastructure's generic service wrapper functionality, such sample code snippets could be generated by the infrastructure. The generated logic (e.g., the discussed SQL select statement) might also be provided to developers by the infrastructure for increasing the efficiency of the development process and supporting the creation of automated tests, including tests independent from the direct usage of the core infrastructure functionality.

The example use cases discussed thus far have focused on read-only use cases. Often services used in such scenarios are, at least partially, mappable by their own metadata as discussed above. In contrast, business logic is often too complex to be defined by means of modelled metadata alone. For handling data maintenance scenarios, the disclosed infrastructure may primarily engage traces to gain insights into the actual dependencies. In some embodiments, the underlying tracing facilities might already exist, independent of the disclosed infrastructure. In these cases, the disclosed infrastructure might provide tailored adapters for incorporating the related trace functionality. These adapters may include options for configuring, scheduling, and analyzing traces.

Figure 41:
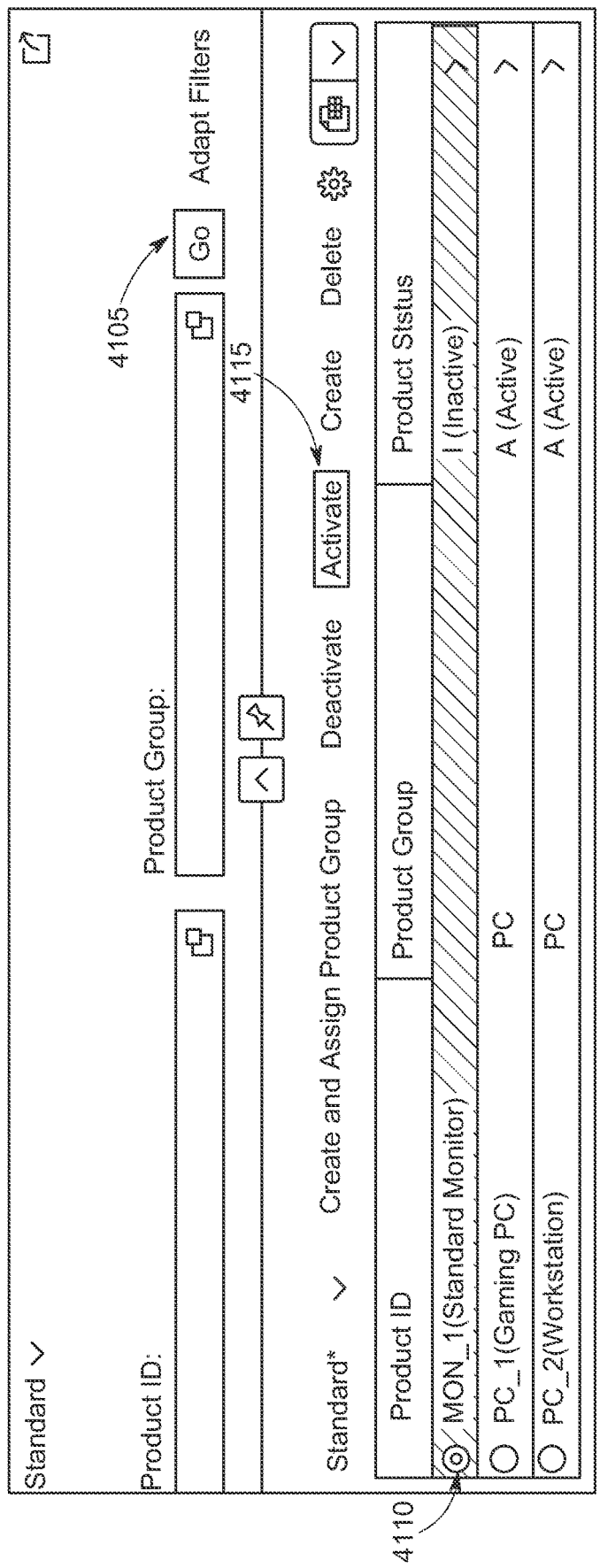
FIG. 41 is an illustrative UI, according to some example embodiments.
Figure 42:
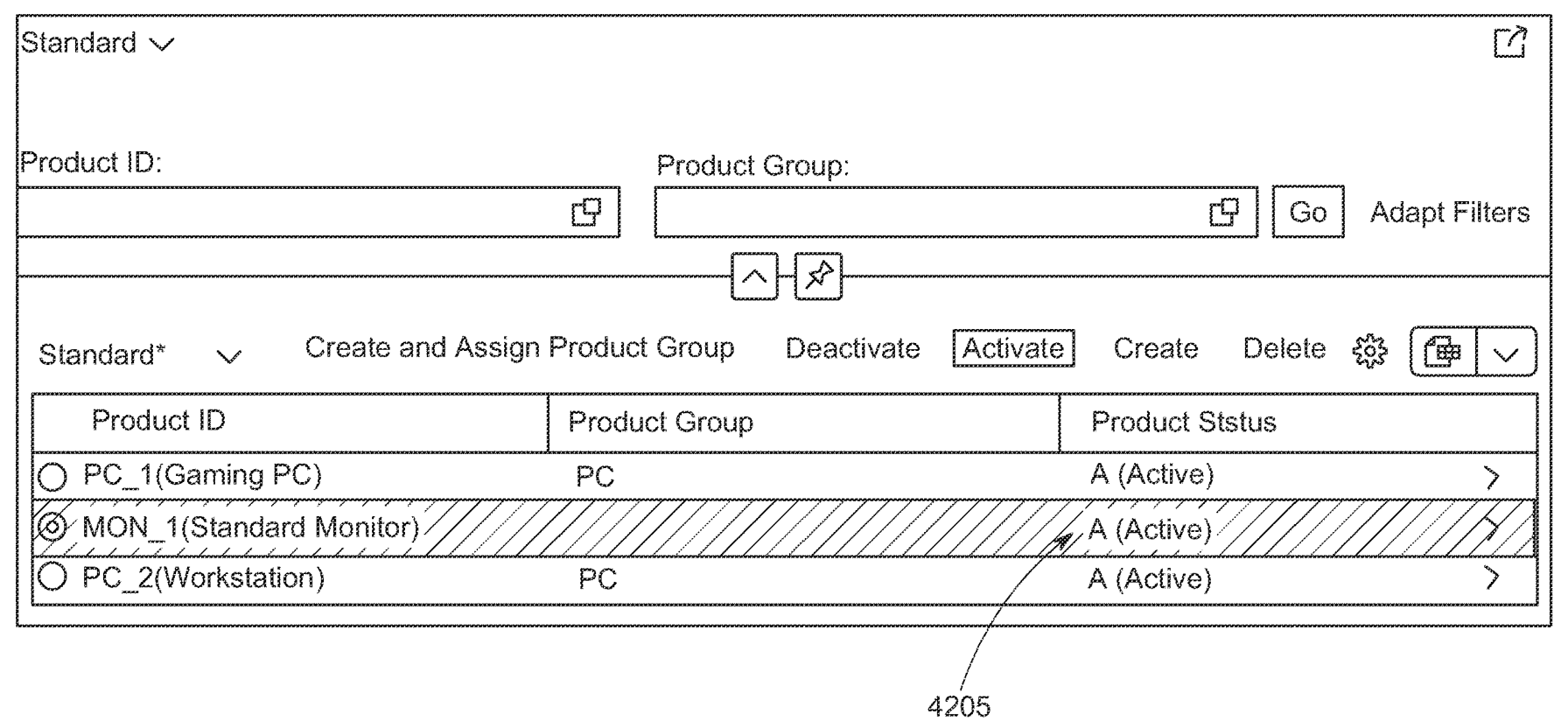

The example UI application introduced herein above will be referenced again for demonstrating two maintenance scenarios. As an example, after launching the UI depicted in FIG. 41, the list of products may be populated by pressing "Go" (4105). In response thereto, product "MON_1" (4110) is shown with the status "I (Inactive)". In this example, switching this status to "A (Active)" and analyzing how this request is being processed in the underlying application stack is desired. In order to achieve this objective, a trace (e.g., a "ABAP Cross Trace") may be created by selecting the product "MON_1" and pressing the "Activate" button 4115 for triggering the status transition. The result of such actions is shown in FIG. 42. As seen, the status is changed to "A (Active)" at 4205.

Figure 43:
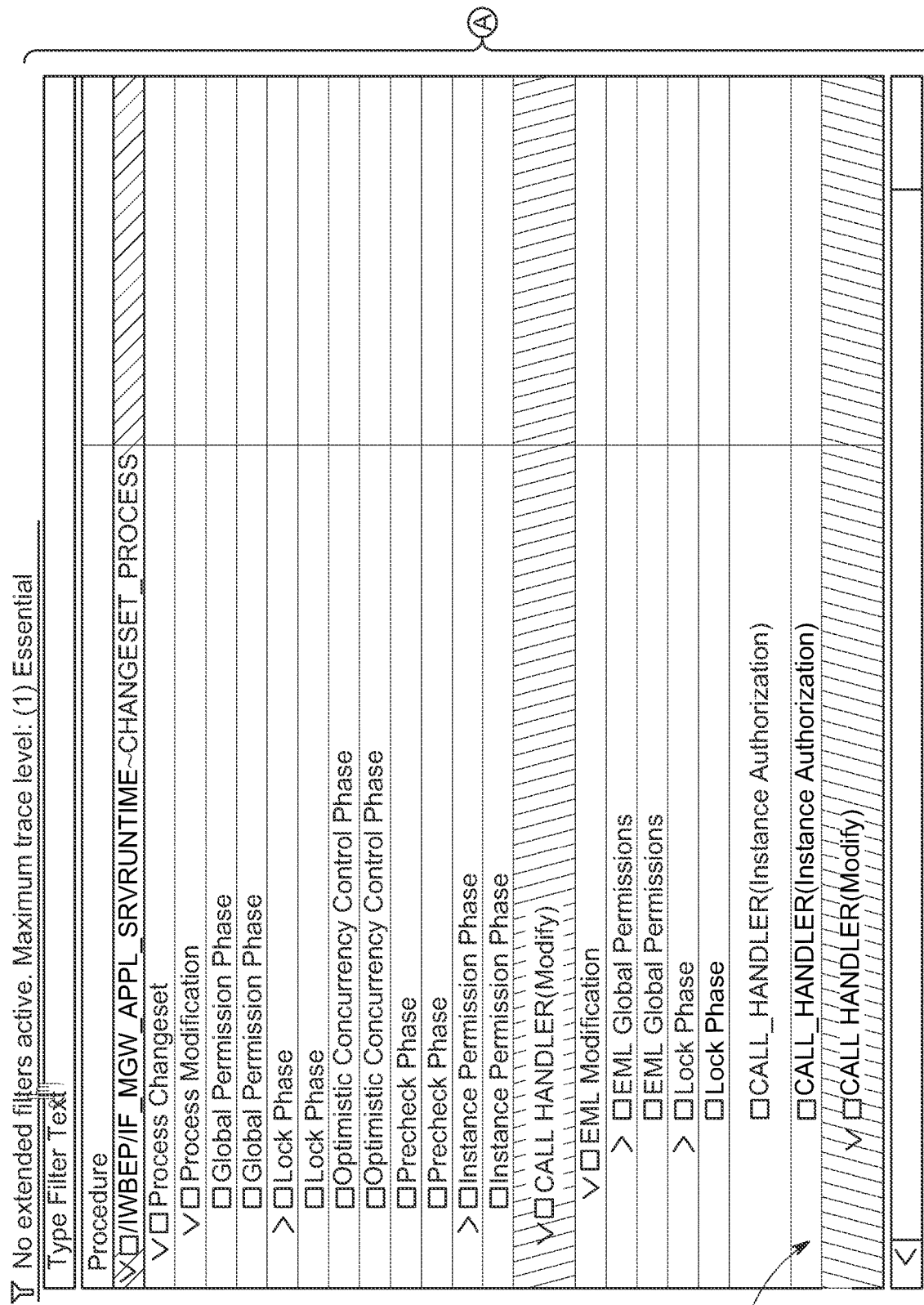
FIG. 43 is an illustrative trace data representation, according to an example embodiment.
Figure 43:
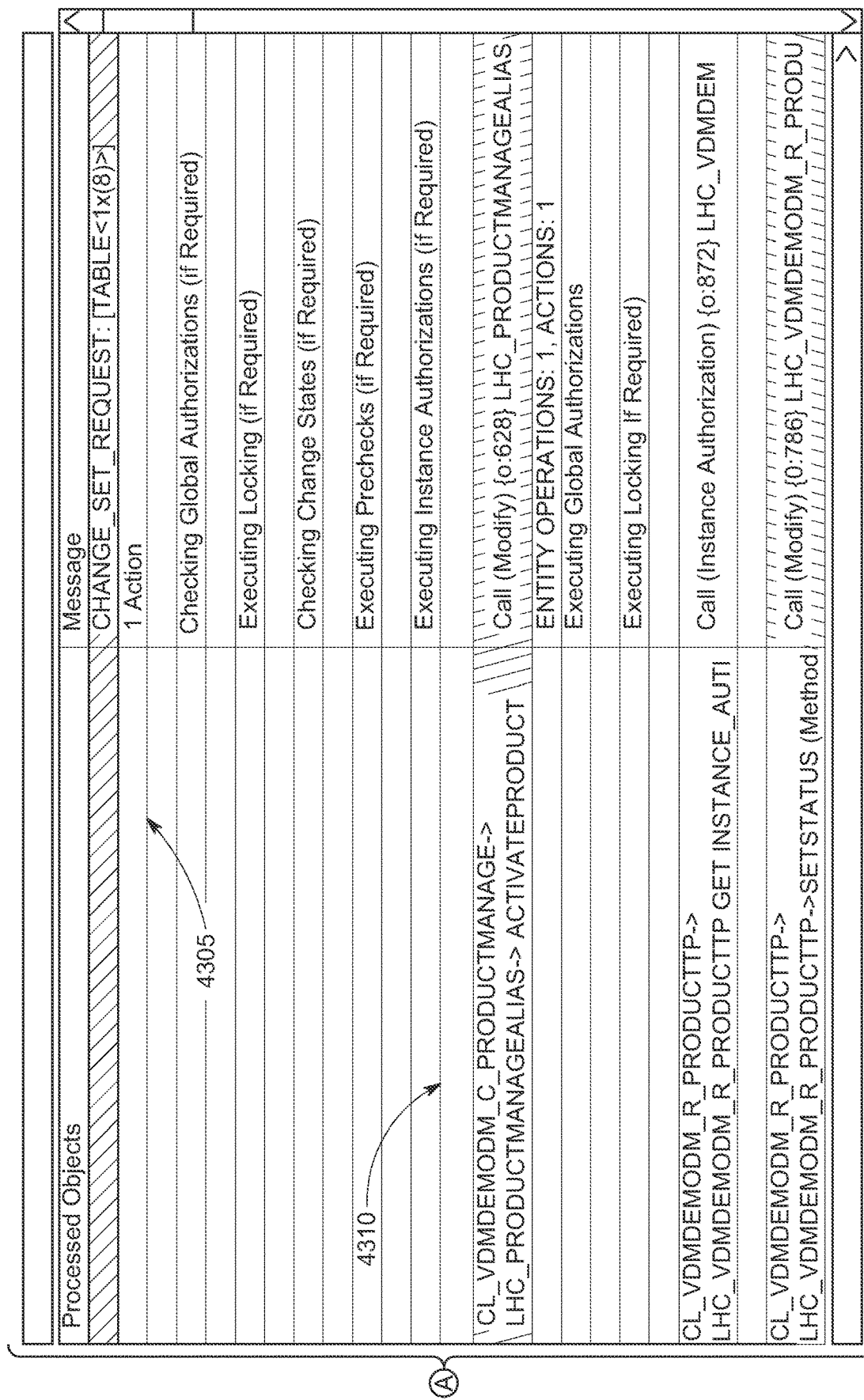

At this point, the tracing can be stopped and the recorded trace can be evaluated. As illustrated in FIG. 43, the traced interaction shows that there are a plurality of processing steps being executed in the context of the processed status transition. The trace reveals framework internal processing logic, general processing steps, etc. For example, steps such as, Start Authorization check, Instance Authorization checks, Lock Handling, and other operations may be invoked.

For the actual service mapping and composition, from a perspective of the disclosed infrastructure, only those steps that can directly be addressed by a service consumer (e.g., in this case by an OData and/or an EML consumer) may be of interest. These particular steps are highlighted in FIG. 43 at 4305, 4310, and 4315. In greater detail, the first functional OData call may have the form as shown in FIG. 44. That is, the UI action "Activate" is bound to the OData action "ActivateProduct" and the entity instance that is identified by the property evaluation "ID"="MON_1". This OData action in turn invokes the action, depicted in FIG. 45, on the EML (Entity Manipulation Language) level. Therein, the UI action "Activate" triggered the action "ActivateProduct" from entity "VDMDEMODM_C_ProductManage", passing the instance key "ID"="MON_1".

The third functional call, 4315, may look as shown in FIG. 46. The implementation of action "ActivateProduct" delegated the service request to action "SetStatus" of entity "VDMDEMODM_R_ProductTP". Accordingly, it passed the instance key "Product"="MON_1" and the action parameter "ProductStatus"="A".

Since these are the only modifying service invocations in the call stack, it may be concluded that all three of these service calls yield the same data changes. In other words, that instead of invoking the first action from the UI, the second or third action could have been invoked for maintaining the status. This aspect holds true if the potentially executed additional check logic implemented inside the first action (which could inhibit the action execution or adapt the response) would not be required or even wanted. In this case, a lot of processing steps could have been omitted as depicted by the trace data shown in FIG. 43. Accordingly, this means that the consolidation and redirection of individual service requests can be leveraged for improving the overall performance (e.g., increasing throughput while reducing resource consumption).

Similar to the field mapping that is discussed here above, the mapping of function invocations may be captured as illustrated in FIG. 47. Therein, the discussed mapping of the action "ActivateProduct" of entity "VDMDEMODM_C_ProductManage" to the action "SetStatus" of entity "VDMDEMODM_R_ProductTP" is captured.

Figure 48:
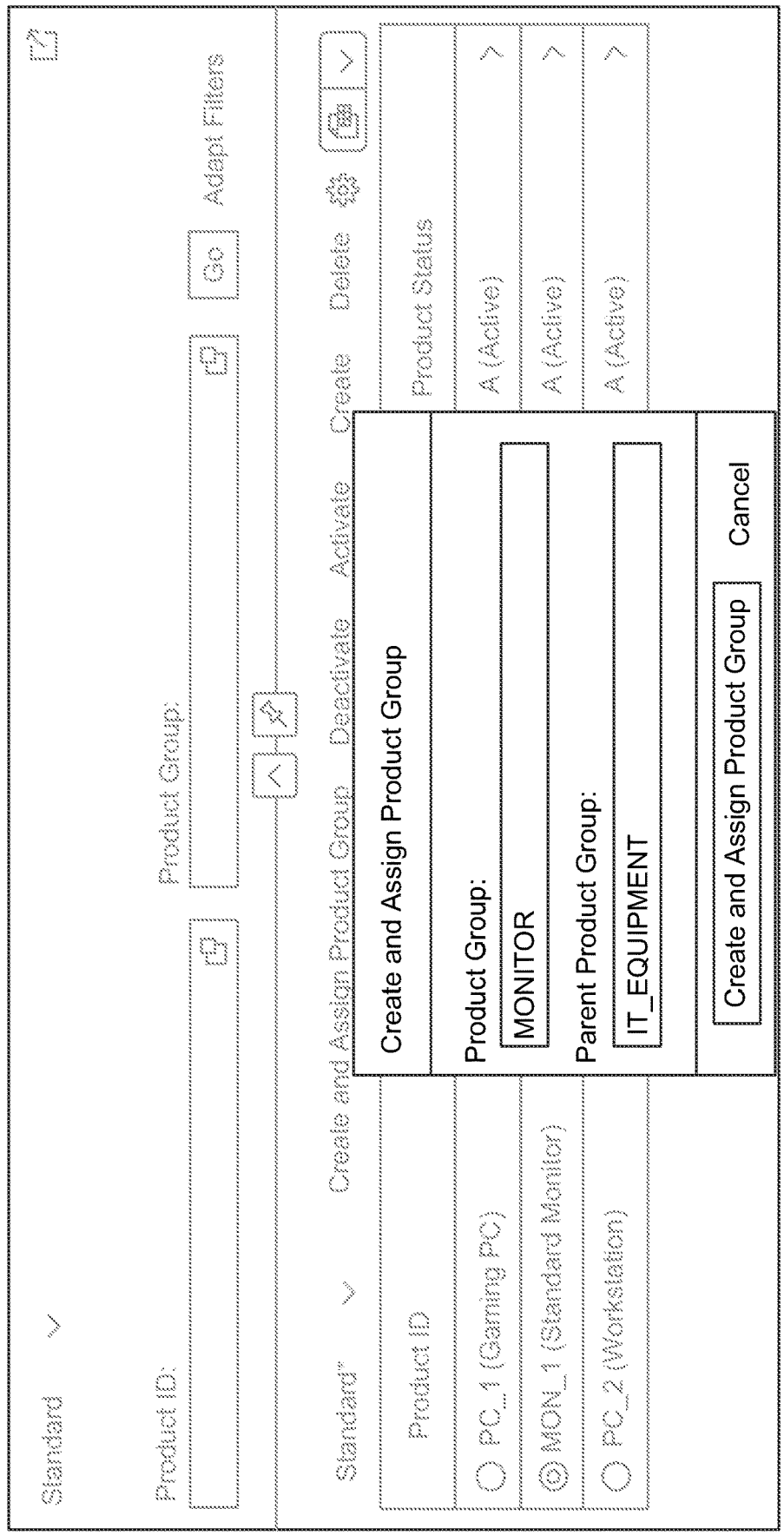
FIG. 48 is an illustrative UI, according to an example embodiment.

In some aspects, the action delegation discussed hereinabove is straight forward and can be captured in disclosed infrastructure similar to Create, Update, and Delete service invocations. But there may be other, more complex function calls, too. The following example will highlight some aspects related thereto. As an example, the product "MON_1" does not yet have a product group assigned. In this example, a new product group "MONITOR" is assigned to this product by invoking a corresponding UI action "Create and Assign Product Group" and entering the requested information, as illustrated in FIG. 48. These actions may trigger an OData request with a change set, as reflected in FIG. 49. A representation of the corresponding ABAP cross trace is shown in FIG. 50.

Therein, four (4) processing steps are highlighted in FIG. 50 and may be described as follows. The UI action "CreateAndAssignProductGroup" invoked an equally named action of entity "VDMDEMODM_C_ProductManage" for the instance "ID"="MON_1". It supplied the parameter values "ProductGroup"="MONITOR" and "ParentProductGroup"="IT_EQUIPMENT", as entered by the user in the displayed action popup. A detailed representation of this traced request is shown in FIG. 51.

This request results in an existence check for the entered product group. This may be realized by an EML read access ("OP"="R") on the corresponding entity "VDMDEMODM_R_ProductGroupTP" supplying the key "ProductGroup"="MONITOR", as reflected in FIG. 52. Because this product group does not exist as indicated by the empty/failed EML read response, the product group is being created by subsequently issuing a Create ("OP"="C") request to entity "VDMDEMODM_R_ProductGroupTP" transferring the entered "ProductGroup"="MONITOR" and its parent "ParentProductGroup"="IT_EQUIPMENT". This is reflected in FIG. 53.

After successful creation, the newly created product group is used to update ("OP"="U") the instance "Product"="MON_1" of entity "VDMDEMODM_R_ProductTP" with the value "ProductGroup"="MONITOR", as reflected in FIG. 54.

This orchestration of calls can be captured in the infrastructure and is represented in FIG. 55. In particular, the entity "VDMDEMODM_C_ProductManage" offers an operation "CreateAndAssignProductGroup", which is of type "EXECUTE". This action is bound to two source operations—a "MODIFY" operation on the entity "VDMDEMODM_R_ProductGroupTP", which maps the input parameters of action "CreateAndAssignProductGroup" onto equally named fields of entity "VDMDEMODM_R_ProductGroupTP". It's noted that the "MODIFY" operation represents a conditional "CREATE" or "UPDATE" operation, which captures the observed existence check in the trace. After this operation was executed ("PredecessorID":"1"), a second operation "UPDATE" on entity "VDMDEMODM_R_ProductTP" is performed, which updates the field "ProductGroup" with the content of the equally named action parameter for the instance of entity entity "VDMDEMODM_R_ProductTP", which is bound to an instance of entity "VDMDEMODM_C_ProductManage" that the action "CreateAndAssignProductGroup" was executed for.

In some aspects, the indirect creation of product groups via the depicted UI action does not support the efficient creation of hierarchies of product groups. For example, if a product shall be assigned to the new product group "KEYBOARD", which in turn will be created under a new product group "INPUT_DEVICE", the user would need to trigger the action "Create and Assign Product Group" twice. First, they would need to create and assign product group "INPUT_DEVICE" under the existing parent product group "IT_EQUIPMENT" to the product. In a second step, they would need to execute the action again, creating product group "KEYBOARD" under the previously created parent product group "INPUT_DEVICE" and assign it to the product replacing its intermediately assigned product group "INPUT_DEVICE".

Figure 56:
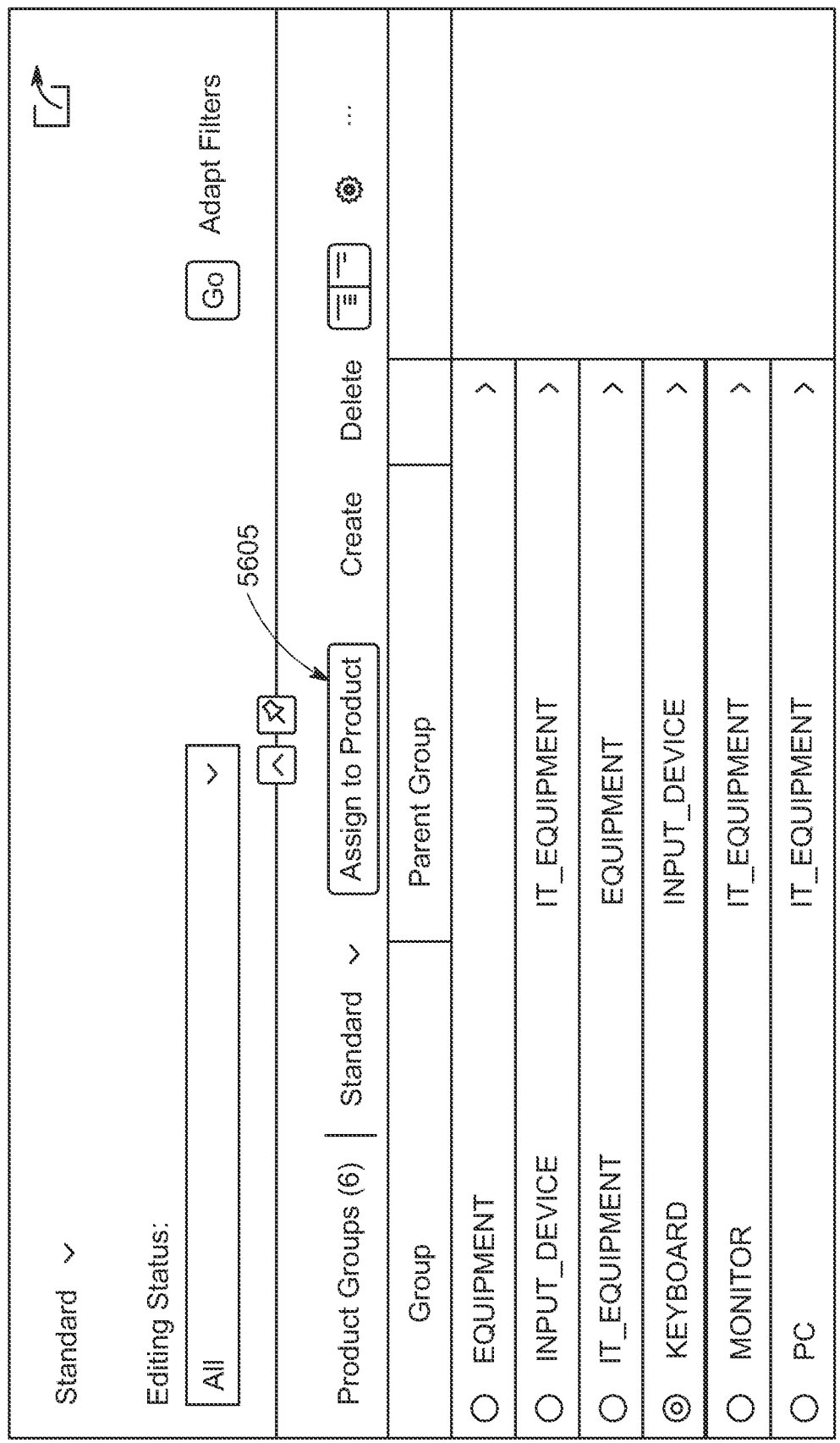
FIG. 56 is an illustrative representation of a UI, according to some example embodiments.

However, such an interaction is neither convenient nor efficient. The disclosed infrastructure could be used to create a new service or enhance the existing service with a function that allows specifying a complete hierarchy of product groups to be created and directly assigning the leaf product group to a product. Alternatively, knowing the process steps as explained by the gathered metadata, a dedicated UI application for maintaining product groups could be created, as indicated in FIG. 56. The UI application, represented in FIG. 56, may allow the assigning of product groups to products via an action illustrated at 5605. Additionally, or as an alternative, the product group field could become editable within the original UI application for product maintenance.

In one instance, assume that the underlying entities "VDMDEMODM_R_ProductTP" and "VDMDEMODM_R_ProductGroupTP" were not released for customer usage. In this case, they cannot be used for defining new services or extensions of existing services by cloud customers. In this case, the infrastructure can be used for remapping the services.

Figure 58:
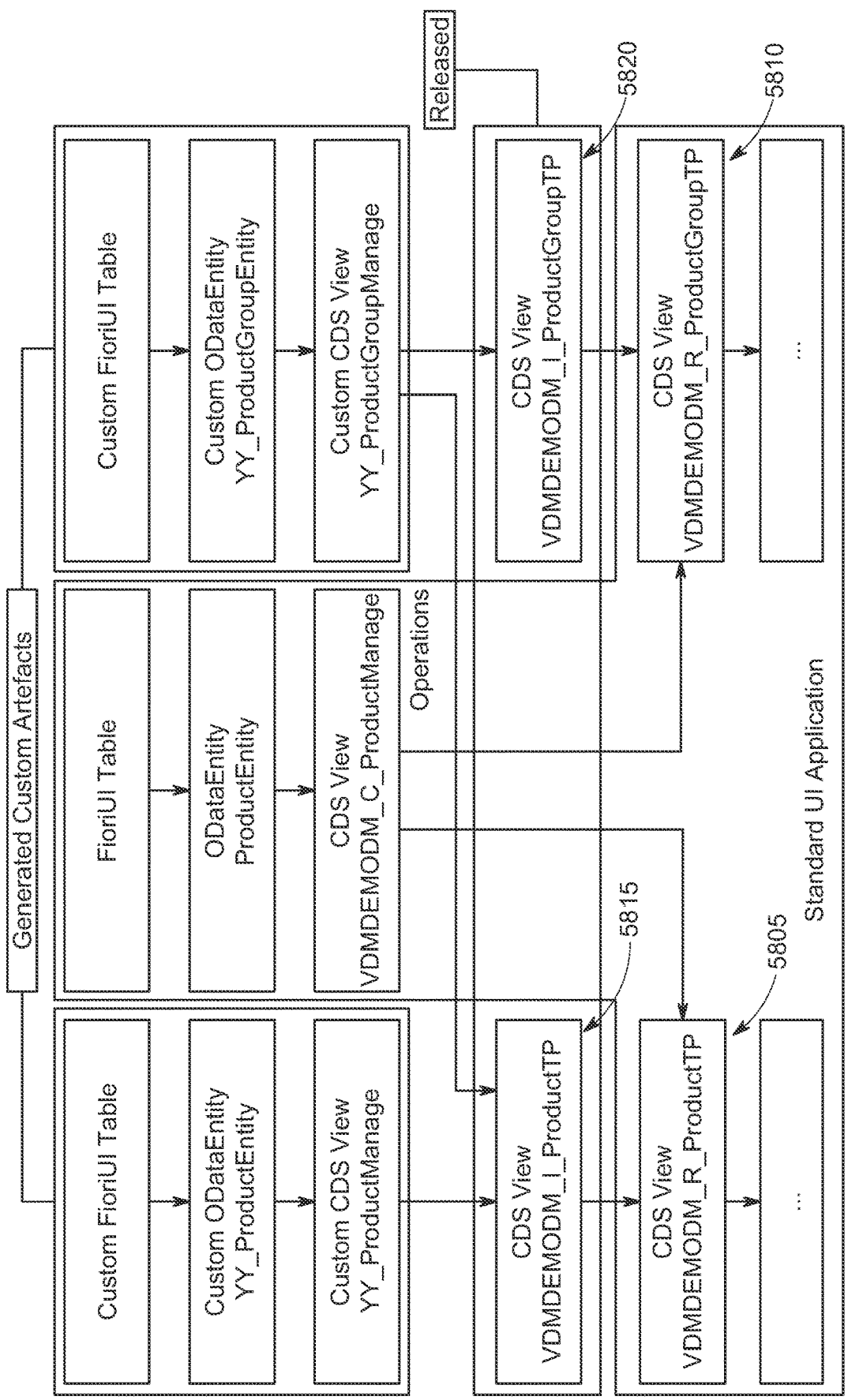
FIG. 58 is an illustrative representation for a new service implementation, according to an example embodiment.

For example, if the entities "VDMDEMODM_I_ProductTP" and "VDMDEMODM_I_ProductGroupTP" were released and their operation "MODIFY" could be mapped onto the "MODIFY" operation of the entities "VDMDEMODM_R_ProductTP" and "VDMDEMODM_R_ProductGroupTP", as reflected in FIGS. 57A-57C. then the new UI applications could be redirected to these released entities as illustrated below. In some embodiments, the new UI applications could be redirected to these released entities, as illustrated FIG. 58. As illustrated in FIG. 58, instead of calling services of the CDS views "VDMDEMODM_R_ProductTP" 5805 and "VDMDEMODM_R_ProductGroupTP" 5810 or their base entities, CDS views "VDMDEMODM_I_ProductTP" 5815 and "VDMDEMODM_I_ProductGroupTP" 5820 that are built on top of the original views are now used. Note that these views are not used at all in the original UI app.

Similar to the read access discussed before, in some embodiments there is also an alternative to generating new custom artifacts for maintenance scenarios, wherein a customer might also dynamically invoke the corresponding functionality via the disclosed infrastructures generic wrapper services. In this context the service request may be represented as shown in FIG. 59. As an analysis, it is noted that based on the released service entities "VDMDEMODM_I_ProductTP" and "VDMDEMODM_I_ProductGroupTP", the envisioned maintenance logic is being executed.

When leveraging the generic service component of the disclosed infrastructure, the caller is responsible for the orchestration of the invoked services. That is, in the first request ("RequestID"="1") the caller modifies (creates or updates) two product groups—"INPUT_DEVICE" and "KEYBOARD" with their parents "IT_EQUIPMENT" and "INPUT_DEVICE, respectively". After this request was performed successfully ("PredecessorRequestID":"1"), the second request is triggered, which will update the field "ProductGroup" of entity "VDMDEMODM_I_ProductTP" for instance "Product"="KB_1" with the value "KEYBOARD".

FIG. 60 is an illustrative flow diagram for a process 6000 related to a service mapping and composition infrastructure, according to an example embodiment. In some aspects, process 6000 includes features to determine a complete mapping of an application stack including a plurality of services. In some regards, the aspects of process 6000 been introduced hereinabove and disclosed in great detail, particularly in the context of the many illustrative examples introduced and discussed fully above. As such, a further understanding of process 6000 may be understood by referencing the architecture 100 in FIG. 1A and the numerous examples discussed above. Accordingly, the following discussion of process 6000 will primarily avoid repeating detailed aspects disclosed elsewhere in the present disclosure, not as an indication that other aspects and features are not or cannot be included in some embodiments of process 6000 but rather as a matter of clarity and conciseness.

At operation 6005, a request to map a first service accessible on a first application stack may be received. In some instances, the request may be invoked by an action or process to execute a particular task. For example, an action or process by a user to modify an existing or create a new service might initiate a request to map a first service accessible on a first application stack since a complete mapping may be needed to accomplish the task. In some aspects, the data and operation flow in the first application stack might be based on service invocations between business object representations within the first application stack. In other embodiments, the underlying data structures and instantiations thereof might not be business objects.

At operation 6010, a determination may be made to obtain a complete mapping of the first service, the other services, and the entities comprising business object representations of the first service and business object representations of other services in the first application stack. The complete mapping may be determined based on a combination of factors, including metadata of the first service and other services in the first application stack related to the first service, as well as metadata associated with entities in the first application stack. In some embodiments, the metadata may be associated with trace data associated with data flows between the entities to facilitate the assembly of the complete mapping for the first service. Furthermore, semantic knowledge and manual refinements may be used to enrich respectively increase the precision of the derived mappings.

Continuing to operation 6015, service mapping information for the first application stack may be derived based on the determined complete mapping. The service mapping information may include additional information other than then complete mapping. For example, a number of reasoned conclusions may be generated based on the complete mapping to ultimately derive the service mapping information. The service mapping information may include, at least in part, "insights" about the first application stack and the services thereof, as determined by the infrastructure disclosed herein that enable, for example, the composing modifying of the first service and the creation of new services. based on the existing first service.

At operation 6020, the generated service mapping may be persisted in a persistency of the infrastructure disclosed herein. The generated service mapping information may be stored in any suitable data structure representation and used in further executable processes, such as composing a new service, providing documentation of the first service and/or the first application stack based on the service mapping information, other processes without limits.

Figure 61:
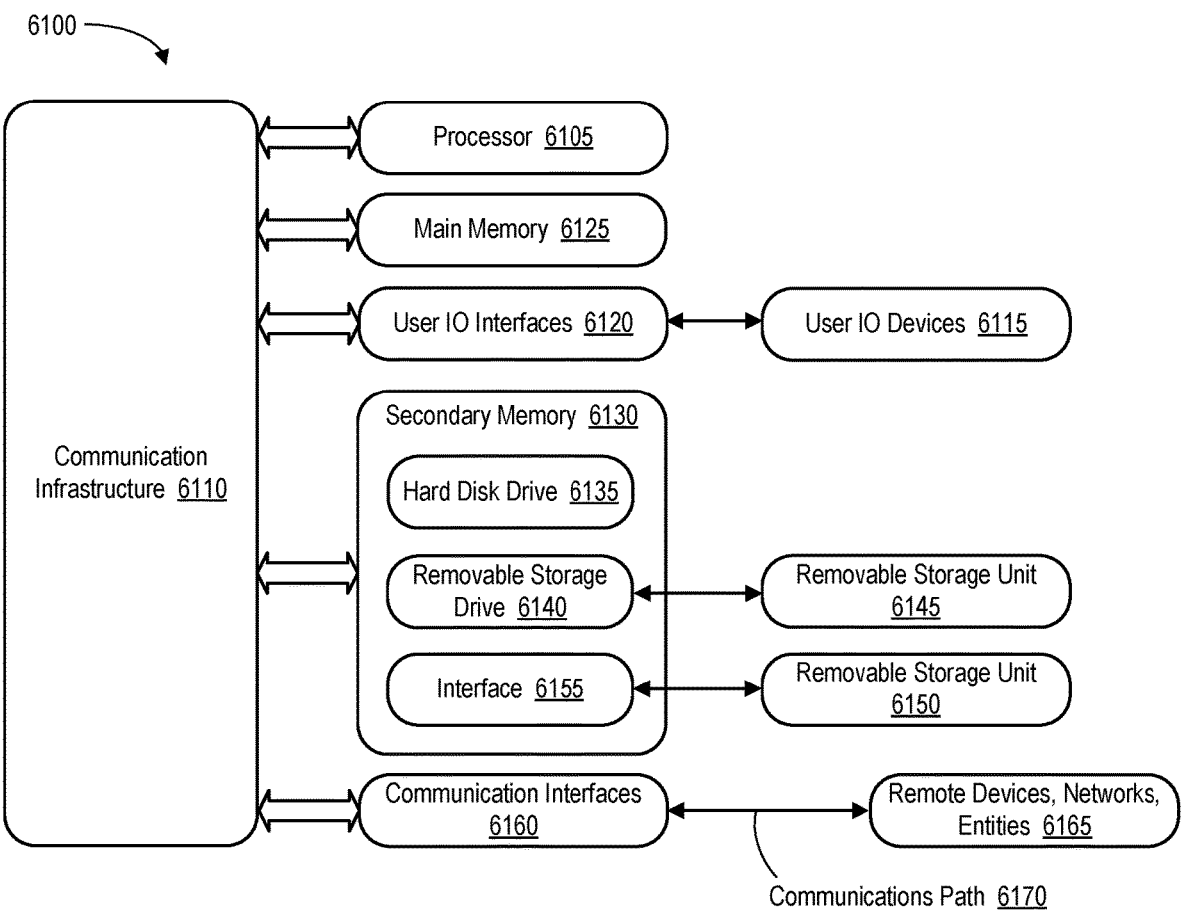
FIG. 61 is an illustrative process flow, according to an example embodiment.

Various embodiments of a service mapping and composition infrastructure disclosed herein may be implemented, for example, using one or more computer systems, such as computer system 6100 shown in FIG. 61. The computer system 6100 can be any computer capable of performing the functions described herein. Computer system 6100 includes one or more processors (also called CPUs), such as a processor 6105. Processor 6105 is connected to a communication infrastructure or bus 6110.

One or more processors 6105 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 6100 also includes user input/output device(s) 6115, such as monitors, keyboards, pointing devices, etc., that communicate with communication infrastructure xx06 through user input/output interface(s) 6120.

Computer system 6100 also includes a main or primary memory 6125, such as Random-Access Memory ("RAM"). Main memory 6125 may include one or more levels of cache. Main memory 6125 has stored therein control logic (i.e., computer software) and/or data.

Computer system 6100 may also include one or more secondary storage devices or memory 6130. Secondary memory 6130 may include, for example, a hard disk drive 6135 and/or a removable storage device or drive 6140. Removable storage drive 6140 may be a floppy disk drive, a magnetic tape drive, a compact disk drive, an optical storage device, tape backup device, and/or any other storage device/drive.

Removable storage drive 6140 may interact with a removable storage unit 6145. Removable storage unit 6145 includes a computer usable or readable storage device having stored thereon computer software (control logic) and/or data. Removable storage unit 6145 may be a floppy disk, magnetic tape, compact disk, DVD, optical storage disk, and/any other computer data storage device. Removable storage drive 6140 reads from and/or writes to removable storage unit 6145 in a well-known manner.

According to an exemplary embodiment, secondary memory 6130 may include other means, instrumentalities or other approaches for allowing computer programs and/or other instructions and/or data to be accessed by computer system 6100. Such means, instrumentalities or other approaches may include, for example, a removable storage unit 6150 and an interface 6155. Examples of the removable storage unit 6150 and the interface 6155 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 6100 may further include a communication or network interface 6160. Communication interface 6160 enables computer system 6100 to communicate and interact with any combination of remote devices, remote networks, remote entities, etc. (individually and collectively referenced by reference number 6165). For example, communication interface 6160 may allow computer system 6100 to communicate with remote devices 6165 over communications path 6170, which may be wired and/or wireless, and which may include any combination of LANs, WANs, the Internet, etc. Control logic and/or data may be transmitted to and from computer system 6100 via communication path 6170.

In an embodiment, a non-transitory tangible apparatus or article of manufacture comprising a tangible computer useable or readable medium having control logic (software) stored thereon is also referred to herein as a computer program product or program storage device. This includes, but is not limited to, computer system 6100, main memory 6125, secondary memory 6130, and removable storage units 6145 and 6150, as well as tangible articles of manufacture embodying any combination of the foregoing. Such control logic, when executed by one or more data processing devices (such as computer system 6100), causes such data processing devices to operate as described herein.

Based on the present disclosure, it will be apparent to persons skilled in the relevant art(s) how to make and use embodiments of the invention using data processing devices, computer systems and/or computer architectures other than that shown in FIG. 61. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. Embodiments are therefore not limited to any specific combination of hardware and software.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:
receiving a request to map a first service accessible on a first application stack, data and operation flow in the first application stack being based on service invocations between business object representations within the first application stack;
determining, based on a combination of metadata of the first service and other services in the first application stack that are related to the first service, metadata associated with entities in the first application stack, and trace data associated with data flows between the entities, a complete mapping of the first service, the other services, and the entities comprising business object representations of the first service and business object representations of other services in the first application stack;
generating, based on the determined complete mapping, service mapping information for the first application stack; and
persisting the generated service mapping information and the determined complete mapping in a persistency.

2. The method of claim 1, wherein the complete mapping includes correlating the metadata of the entities, the metadata associated with the entities, and the trace data associated with data flows between the entities at different levels of the first application stack.

3. The method of claim 1, wherein the complete mapping includes at least one of mapping of entity instances, mapping of relations of the entity instances, and mapping of operations of the first service and the other services.

4. The method of claim 1, wherein the metadata associated with the entities includes metadata indicating value mappings for fields associated with the entities.

5. The method of claim 1, wherein the complete mapping of the entities is further based on semantical mappings obtained by applying a natural language analysis to the entities and metadata thereof.

6. The method of claim 1, wherein the first service being mapped has a defined interface and is reusable in a given domain.

7. The method of claim 1, further comprising generating a new service based, at least in part, on the generated service mapping information, the new service comprising a second application stack different than the first application stack.

8. A system comprising:
at least one programmable processor; and
a non-transitory machine-readable medium storing instructions that, when executed by the at least one programmable processor, cause the at least one programmable processor to perform operations comprising:
receiving a request to map a first service accessible on a first application stack, data and operation flow in the first application stack being based on service invocations between business object representations within the first application stack;
determining, based on a combination of metadata of the first service and other services in the first application stack that are related to the first service, metadata associated with entities in the first application stack, and trace data associated with data flows between the entities, a complete mapping of the first service, the other services, and the entities comprising business object representations of the first service and business object representations of other services in the first application stack;
generating, based on the determined complete mapping, service mapping information for the first application stack; and
persisting the generated service mapping information and the determined complete mapping in a persistency.

9. The system of claim 8, wherein the complete mapping of the entities includes correlating the metadata of the entities, the metadata associated with the entities, and the trace data associated with data flows between the entities at different levels of the first application stack.

10. The system of claim 8, wherein the complete mapping of the entities includes at least one of mapping of entity instances, mapping of relations of the entity instances, and mapping of operations of the first service and the other services.

11. The system of claim 8, wherein the metadata associated with the entities includes metadata indicating value mapping for fields associated with the entities.

12. The system of claim 8, wherein the complete mapping of the entities is further based on semantical mappings obtained by applying a natural language analysis to the entities and metadata thereof.

13. The system of claim 8, wherein the service being mapped has a defined interface and is reusable in a given domain.

14. The system of claim 8, further comprising generating a new service based, at least in part, on the generated service mapping information, the new service comprising a second application stack different than the first application stack.

15. A non-transitory, computer readable medium storing instructions, which when executed by at least one processor cause a computer to perform a method comprising:
receiving a request to map a first service accessible on a first application stack, data and operation flow in the first application stack being based on service invocations between business object representations within the first application stack;
determining, based on a combination of metadata of the first service and other services in the first application stack that are related to the first service, metadata associated with entities in the first application stack, and trace data associated with data flows between the entities, a complete mapping of the first service, the other services, and the entities comprising business object representations of the first service and business object representations of other services in the first application stack;
generating, based on the determined complete mapping, service mapping information for the first application stack; and
persisting the generated service mapping information and the determined complete mapping in a persistency.

16. The medium of claim 15, wherein the complete mapping of the entities includes correlating the metadata of the entities, the metadata associated with the entities, and the trace data associated with data flows between the entities at different levels of the first application stack.

17. The medium of claim 15, wherein the complete mapping of the entities includes at least one of mapping of entity instances, mapping of relations of the entity instances, and mapping of operations of the first service and the other services.

18. The medium of claim 15, wherein the metadata associated with the entities includes metadata indicating value mappings for fields associated with the entities.

19. The medium of claim 15, wherein the complete mapping of the entities is further based on semantical mappings obtained by applying a natural language analysis to the entities and metadata thereof.

20. The medium of claim 15, wherein the service being mapped has a defined interface and is reusable in a given domain.

* * * * *